US012435566B1

(12) United States Patent
Flusche et al.

(10) Patent No.: US 12,435,566 B1
(45) Date of Patent: Oct. 7, 2025

(54) CANTILEVERED GATE KIT

(71) Applicant: Ameristar Perimeter Security USA Inc., Tulsa, OK (US)

(72) Inventors: Benton P. Flusche, Tulsa, OK (US); Nathan T. Haney, Owasso, OK (US)

(73) Assignee: Ameristar Perimeter Security USA Inc., Tulsa, OK (US)

( * ) Notice: Subject to any disclaimer, the term of this patent is extended or adjusted under 35 U.S.C. 154(b) by 0 days.

(21) Appl. No.: 18/744,626

(22) Filed: Jun. 15, 2024

Related U.S. Application Data

(63) Continuation of application No. 17/861,291, filed on Jul. 11, 2022, now Pat. No. 12,012,798.

(60) Provisional application No. 63/220,704, filed on Jul. 12, 2021.

(51) Int. Cl.
*E06B 11/02* (2006.01)
*E06B 11/04* (2006.01)

(52) U.S. Cl.
CPC .......... *E06B 11/045* (2013.01); *E06B 11/026* (2013.01)

(58) Field of Classification Search
CPC ... E06B 11/026; E06B 11/045; E05D 15/0617
See application file for complete search history.

(56) References Cited

U.S. PATENT DOCUMENTS

| | | | | |
|---|---|---|---|---|
| 4,723,374 | A * | 2/1988 | Peterson | E06B 11/045 49/404 |
| 5,136,813 | A | 8/1992 | Gibbs | |
| 5,272,838 | A | 12/1993 | Gibbs | |
| 8,356,801 | B2 * | 1/2013 | Howard | E04H 17/1439 256/22 |
| 8,627,603 | B2 | 1/2014 | Flannery et al. | |
| 9,518,424 | B1 * | 12/2016 | Woodard | E06B 11/04 |
| 9,879,457 | B1 | 1/2018 | Weldon | |
| 10,081,950 | B2 * | 9/2018 | Bizzarri | E04F 11/1836 |
| 2010/0155683 | A1 * | 6/2010 | Payne | E04H 17/1439 256/65.01 |
| 2014/0259930 | A1 * | 9/2014 | Gilliam | E05F 15/635 49/70 |

* cited by examiner

*Primary Examiner* — Daniel J Troy
*Assistant Examiner* — Susan M. Heschel
(74) *Attorney, Agent, or Firm* — Gary Peterson

(57) ABSTRACT

The frame of a cantilevered gate is formed from upper and lower tracks, each of which is formed from a series of track sections. Adjacent track sections are spliced together. At the lower track, two mirror-image lower splicing elements fit over opposite sides of the joined track sections. At the upper track, a single upper splicing element forms an external connection between the track sections, while a splicing block forms an internal connection. Paired upper and lower track sections are joined by upright members. The upright members are seated at opposite ends within a tubular member of a track section. Each tubular member includes an elongate external fin to which pickets are attached.

13 Claims, 21 Drawing Sheets

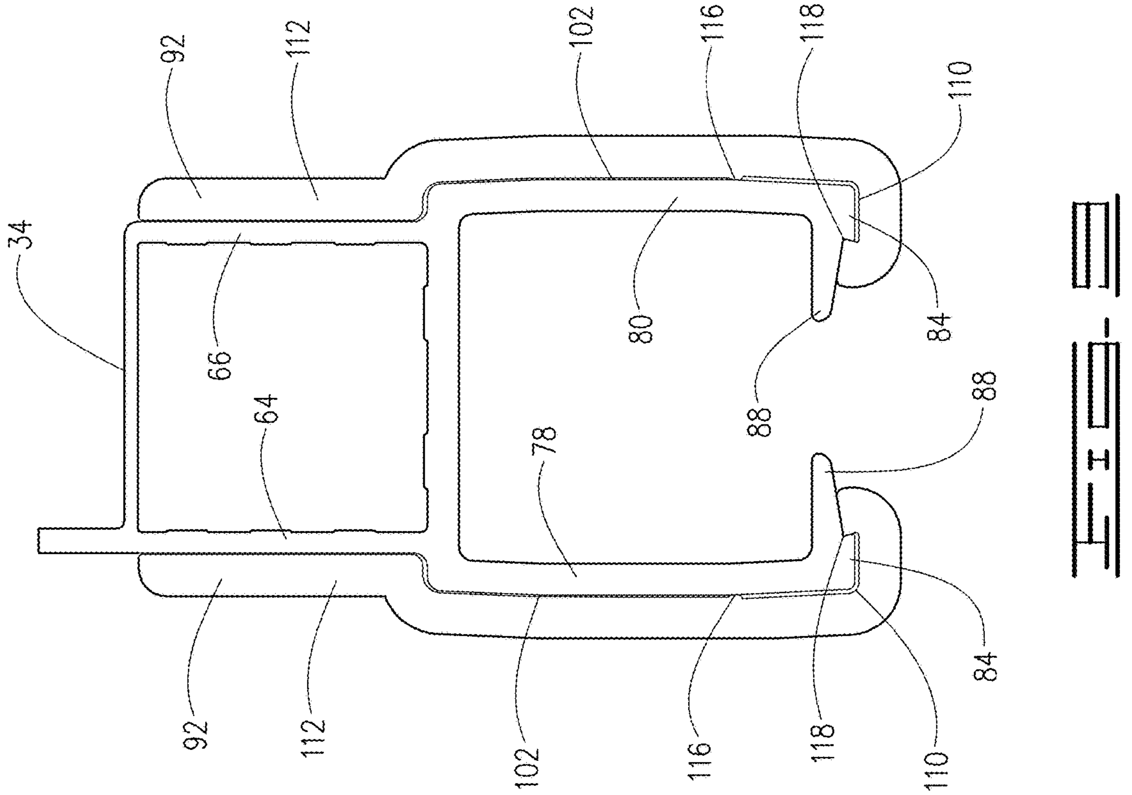
34
92
112
102
116
118
110
66
64
80
84
88
78
92
112
102
116
118
110
84
88
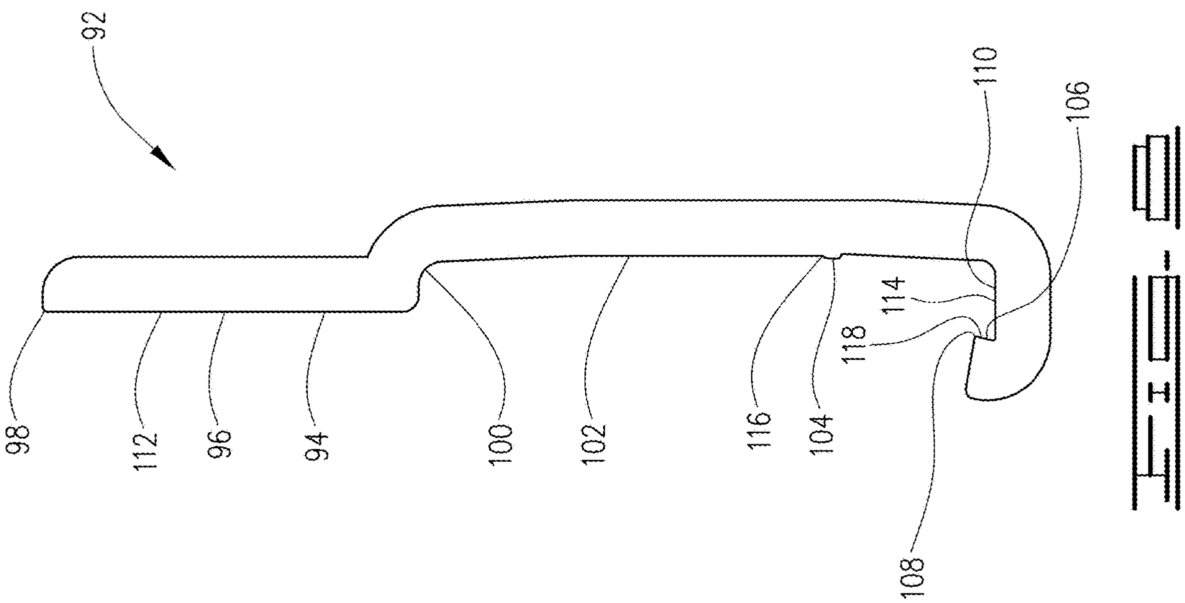
92
110
106
114
118
98
112
96
94
100
102
116
104
108

CANTILEVERED GATE KIT

SUMMARY OF THE INVENTION

A kit is formed from first and second track sections. The first track section includes an elongate first raceway and an elongate first tubular member. The first raceway is channel-shaped, with the channel mouth opening in a first direction. The first tubular member extends in parallel relationship to the first raceway, but is offset from the first raceway in a second direction. The second direction is in 180-degree opposition to the first direction.

The second track section, which has a different cross-sectional shape than the first track section, includes an elongate second raceway and an elongate second tubular member. The second raceway is channel-shaped, with the channel mouth opening in a third direction. The second tubular member extends in parallel relationship to the second raceway, but is offset from the first raceway in a fourth direction. The fourth direction is orthogonal to the third direction. Another kit is formed from first and second track sections and an elongate splicing element configured to join those sections. Each track section has an elongate lower side wall having a body that joins a terminal heel. The splicing element, which has a uniform cross-sectional shape along its length, includes an elongate trough and an elongate base having a longitudinal ridge. The ridge is laterally offset from the trough. The heel of the side wall of each track section is receivable within the trough, and the body of the side wall of each track section is positionable in face-to-face relationship with the base and in engagement with the ridge.

Another kit is formed from first and second track sections and an elongate splicing element configured to join those sections. Each track section includes an elongate outer side wall having a body and a heel. The body has an overhanging projection that extends outside the footprint of the rest of the track section. The heel joins the body at the projection.

The splicing element, which has a uniform cross-sectional shape along its length, includes a flat first riser strip, a flat tread strip and a second riser strip. The second riser strip includes an elongate and flat upper section, an elongate and flat lower section, a lip, and opposed inner and outer surfaces. The upper section joins the tread strip opposite the first riser strip and extends in parallel relationship to the first riser strip. The lower section extends in parallel and outwardly-offset relationship to the upper section. The lip joins the lower section opposite the upper section.

The lower section and the lip cooperate to define an elongate recess in the inner surface. The projection of each track section is receivable within the recess, and the heel of each track section is engageable with the lip.

Another kit is formed from an elongate upper track section, an elongate lower track section, a plurality of upright members, and a plurality of pickets. The lower track section includes an elongate tubular member having a plurality of longitudinally-spaced and collinear upright openings formed therein. An elongate external fin projects from the tubular member.

Each upright member is receivable within a corresponding one of the upright openings. Each picket has a lesser circumference than that of any of the plural upright members and is attachable adjacent each of its ends to the fin. The fin is configured, at a plurality of longitudinally-spaced locations, for attachment to a picket.

Another kit is formed from an elongate track section and a roller assembly. The track section includes a channel bounded in part by a pair of laterally-spaced side walls. The roller assembly includes a platform, a roller and a spacer. The roller is receivable within the track section, is rotatable about an axis that extends through the platform, and is disposable in rolling engagement with each side wall of the channel. The spacer is interposed between the roller and the platform.

BRIEF DESCRIPTION OF THE DRAWINGS

FIG. 6 is an end elevation view of the lower track section shown in FIG. 4, taken along line 6-6.

FIG. 9 is an end elevation view of two lower splicing elements assembled with a lower track section.

FIG. 14 is a perspective view of a portion of one end of the upper track section shown in FIG. 11.

FIG. 19 is an exploded perspective view of a portion of an upper track section, showing its assembly with an upright member, and the assembly of a diagonal bracket with a diagonal member.

FIG. 32 is a perspective view showing portions of a fence post, a latch post, a guide and a receiver.

DETAILED DESCRIPTION

Figure 1:
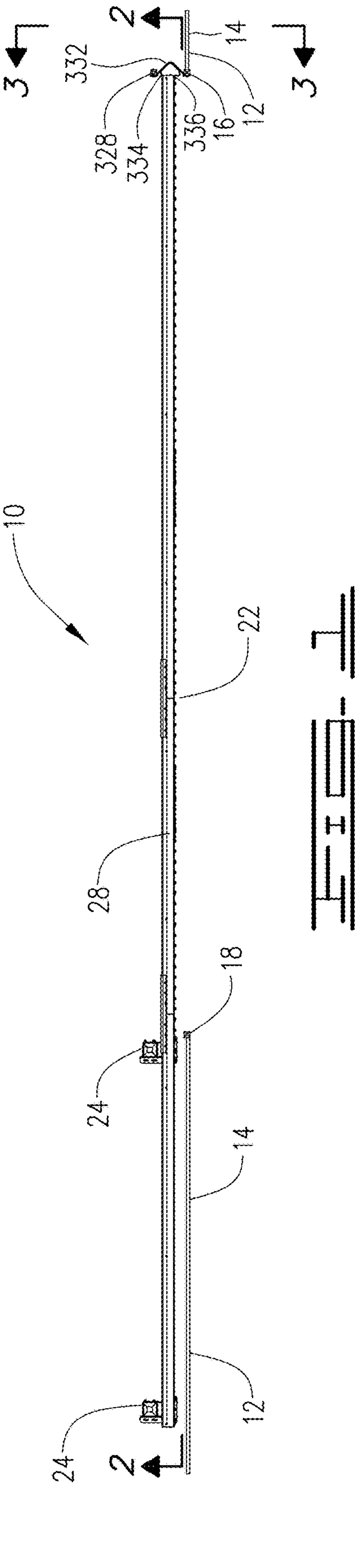
FIG. 1 is a top plan view of a portion of an enclosure, including a gate assembly and a portion of a fence.
Figure 2:
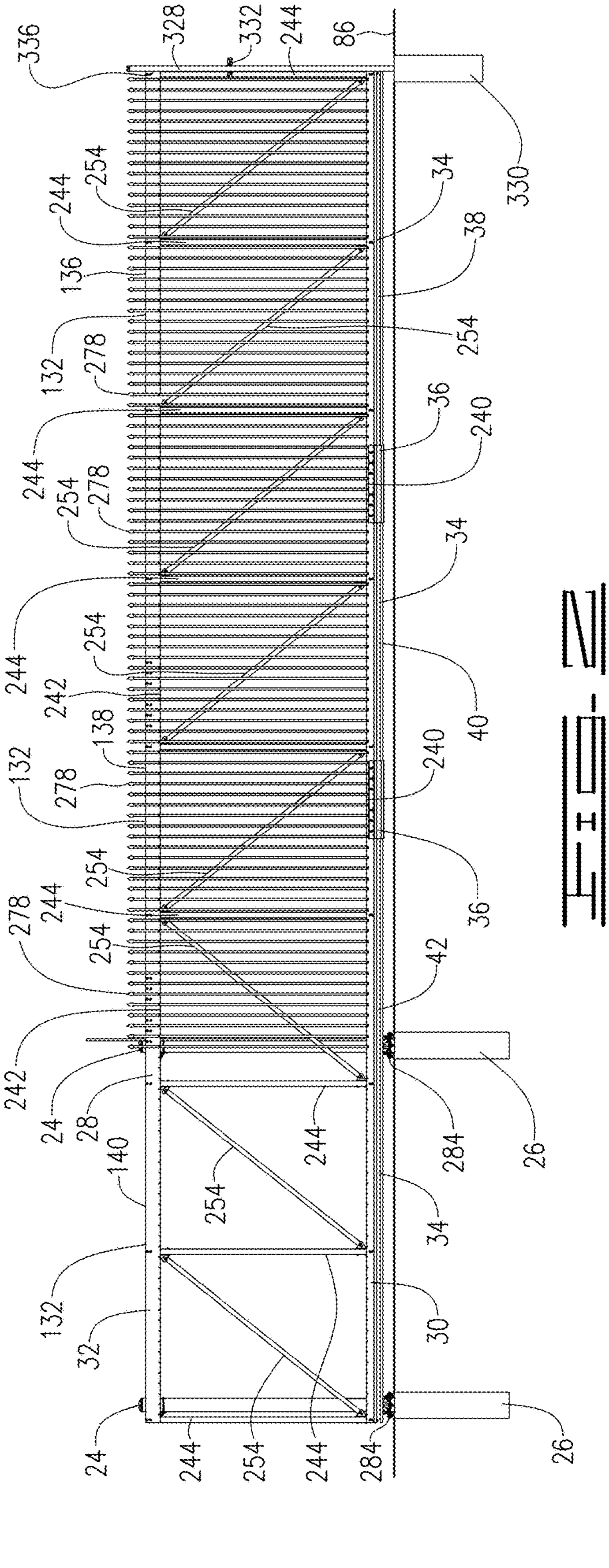
FIG. 2 is a front elevation view of the gate assembly of the enclosure shown in FIG. 1, taken along line 2-2.
Figure 3:
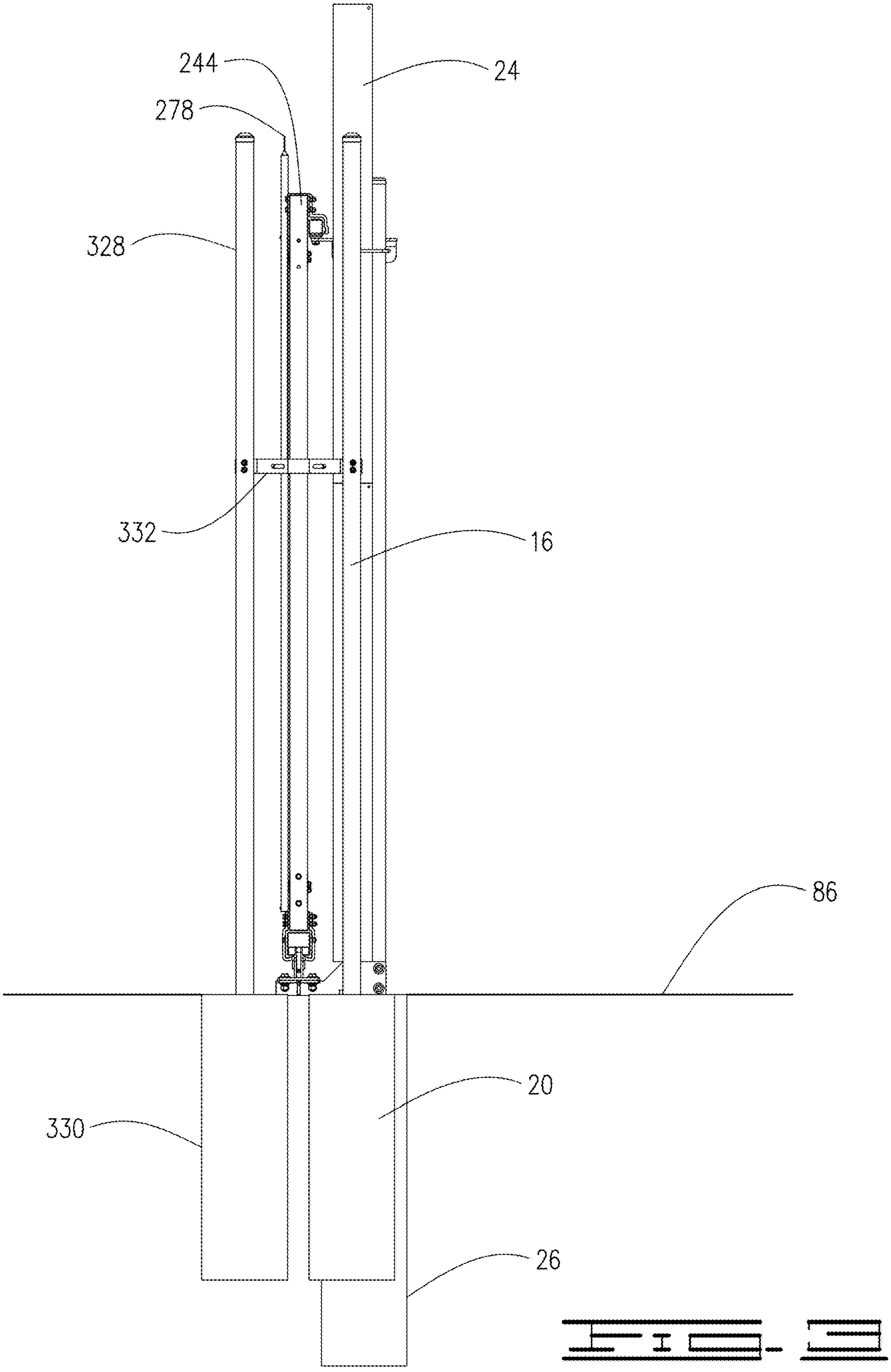
FIG. 3 is a end elevation view of the enclosure shown in FIG. 1, taken along line 3-3.
Figure 4:
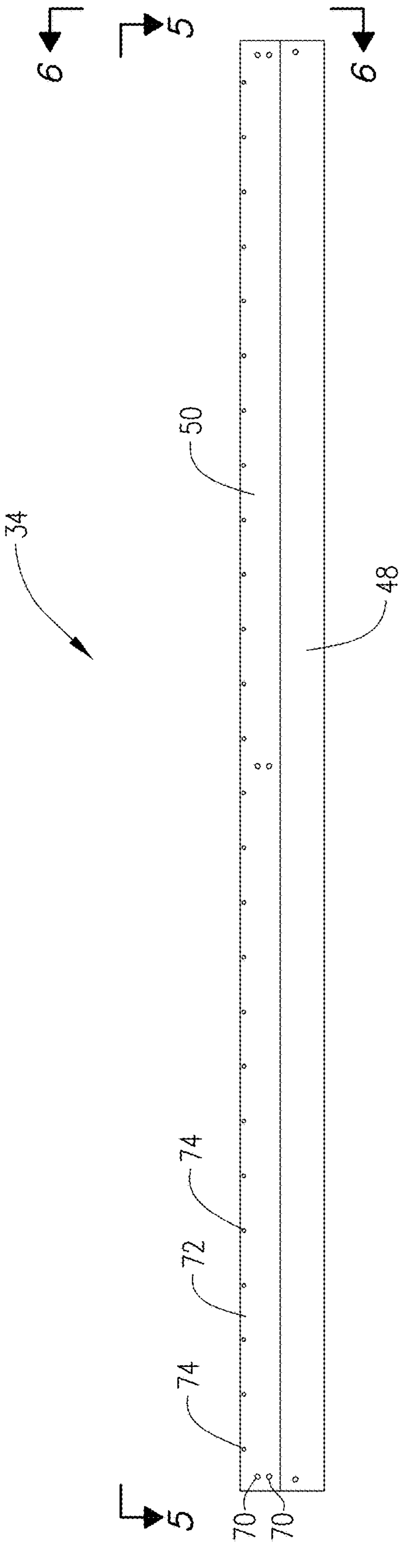
FIG. 4 is a front elevation view of a lower track section.

With reference to FIGS. 1-3, a gate assembly 10 is adapted for incorporation into an enclosure 12. Preferably, the enclosure 12 comprises a fence 14, shown in FIG. 1. The fence 14 is supported by a series of horizontally-spaced and vertically-extending fence posts, including a first fence post 16, and a second fence post 18. Each of the fence posts is securely anchored at its base into a substrate 20, such as the ground or an underground mass of concrete.

In addition to the plurality of fence posts, the fence 14 preferably further comprises a plurality of rails (not shown), which extend substantially horizontally and interconnect adjacent pairs of fence posts. Each adjacent pair of fence posts may be connected by a single rail, or by a plurality of rails, which are preferably parallel. The fence 14 preferably further comprises infill material (not shown) supported by the rails. The infill material may comprise a fencing fabric, or may comprise a plurality of horizontally-spaced, vertically-extending fence pickets.

The first and second fence post posts 16 and 18 are situated on opposite sides of a gap 22 in the fence 14. Rails and infill material are absent from the gap 22, which may be traversed by a road, driveway or other accessway extending through the enclosure 12. The gap 22 may be selectively opened and closed by the gate assembly 10, at least a part of which is horizontally slidable across the gap 22.

The gate assembly 10 comprises a plurality of collinear, vertically-extending gate posts 24, which are preferably identical in size, shape and construction. Preferably, each gate post 24 has flat sides and a rectangular, and more preferably square, cross-sectional shape. Each gate post 24 is securely anchored at its base into a substrate 26, such as the ground or an underground mass of concrete. Two gate posts 24 are included in the embodiment shown in FIGS. 1-3. Preferably, all of the gate posts 24 are situated on the same side of the gap 22.

The gate assembly 10 further comprises a gate frame 28 supported by the gate posts 24. The gate frame 28 comprises an elongate lower track 30 and an elongate upper track 32. The lower and upper tracks 30 and 32 preferably extend in horizontal, parallel and vertically-offset relationship, and more preferably are characterized by equal lengths. The gate frame 28 should have a length . . . that exceeds the size of the gap 22.

The lower track 30 is a rectilinear structure formed from at least one lower track section 34. In some embodiments, the lower track 30 may be formed from a plurality of lower track sections 34 arranged in end-to-end engagement. One instance where multiple lower track sections 34 may be provided is when a single lower track section 34 lacks sufficient length to span the gap 22. If more than one lower track section 34 forms the lower track 30, then these lower track sections 34 preferably have identical cross-sectional shapes and identical cross-sectional sizes. A lower splicing assembly 36 joins each adjacent pair of lower track sections 34. If more than one lower splicing assembly 36 is included in the lower track 30, the lower splicing assemblies 36 are preferably identical.

In the embodiment shown in the Figures, the lower track 30 is formed from three lower track sections 34. In one particular version of this embodiment, the first lower track section 38 has a length of 186.5 inches, the second lower track section 40 has a length of 142.5 inches, and the third lower track section 42 has a length of 281.5 inches.

As shown in FIGS. 4-7, each lower track section 34 is an elongate member having a uniform cross-sectional shape and size. Preferably, it is of single-piece construction. Each lower track section 34 defines a front side 44, which is relatively free of structure, and an opposed back side 46, where a first raceway 48 and a first tubular member 50 are formed. The first raceway 48 and the first tubular member 50 are preferably of equal length.

The first raceway 48 is an elongate structure having the shape of a channel 52. The mouth 54 of the channel 52 opens in a first direction 56. The first tubular member 50 is an elongate structure that extends in parallel relationship to the first raceway 48. The first tubular member 50 is offset from the first raceway 48 in a second direction 58, which direction is in 180-degree opposition to the first direction 56.

The first tubular member 50 is characterized by an upper wall 60 and a vertically-offset lower wall 62. The upper and lower walls 60 and 62 are interconnected by a pair of laterally-offset and parallel side walls, namely front side wall 64 and back side wall 66. One side of the front side wall 64 faces the front side 44 of the lower track section 34, while the back side wall 66 is situated on the back side 46.

Figure 7:
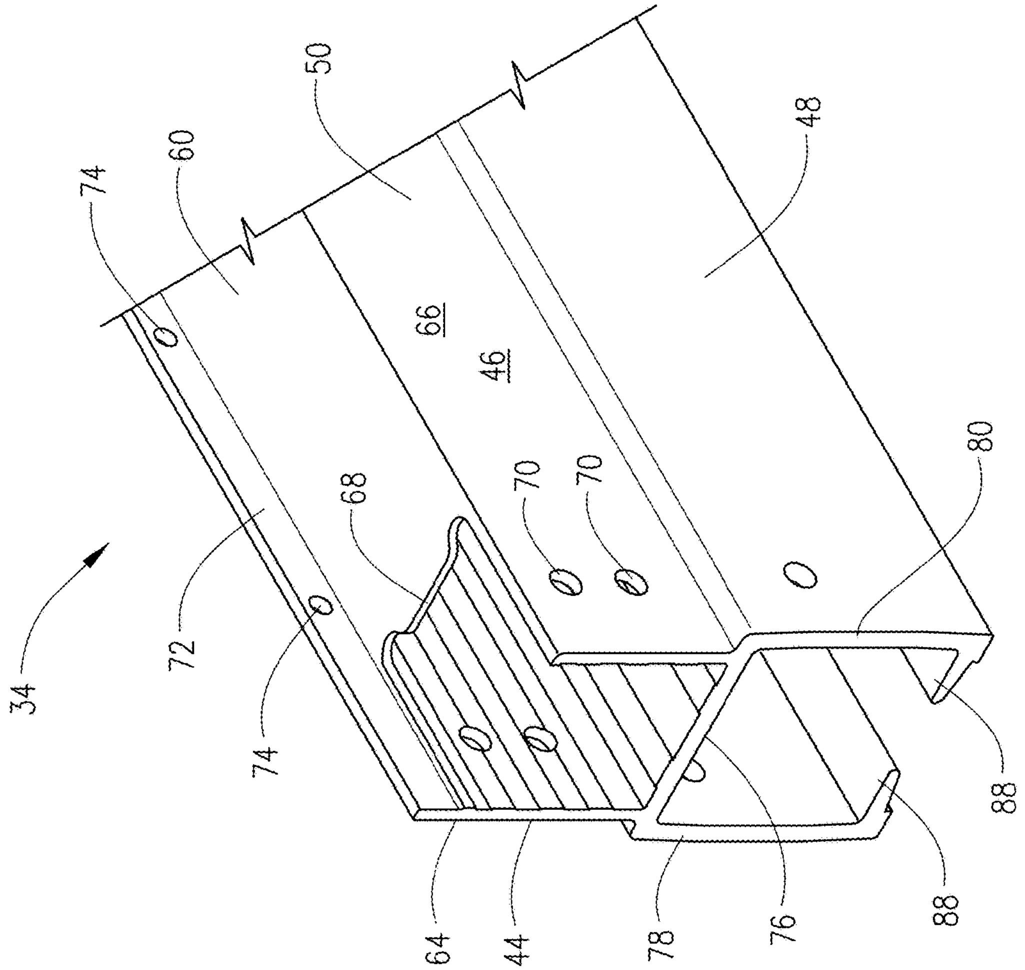
FIG. 7 is a perspective view of a portion of one end of the lower track section shown in FIG. 4.

The upper wall 60, lower wall 62 and side walls 64 and 66, each of which are preferably substantially flat, cooperate to form a structure having a rectangular cross-sectional shape. As best shown in FIG. 7, the interior of the first tubular member 50 is preferably characterized by longitudinally-extending corrugations.

Figure 5:
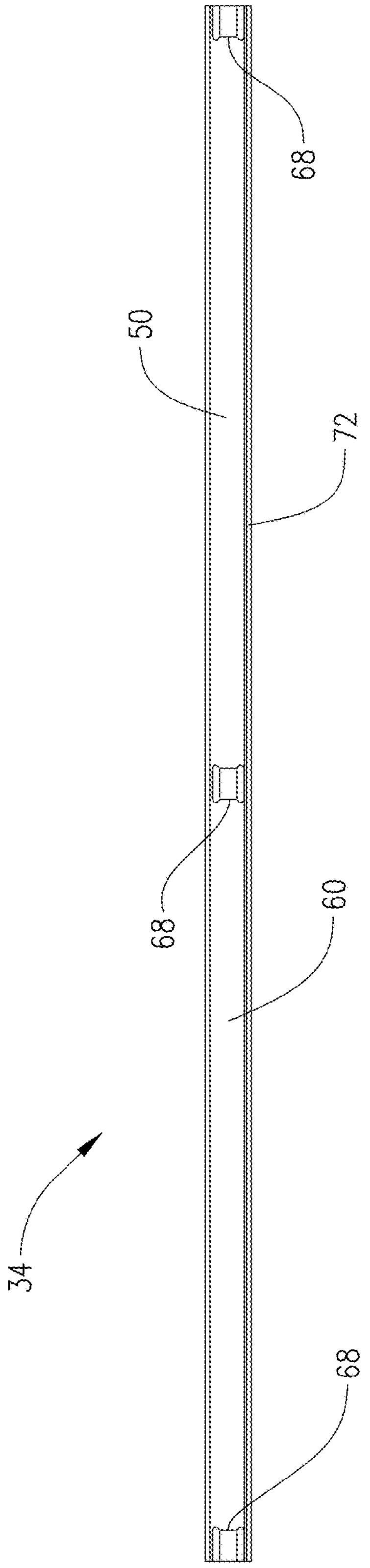
FIG. 5 is a top plan view of the lower track section shown in FIG. 4, taken along line 5-5.

At least one upright opening 68 is formed in the upper wall 60 of the first tubular member 50. More preferably, a plurality of longitudinally-spaced and collinear upright openings 68 are formed in the upper wall 60, as shown in FIG. 5. Preferably, the upright openings 68 are of identical size and shape.

Adjacent each end of the lower track section 34, the first tubular member 50 is penetrated, at the side walls 64 and 66, by pairs of aligned fastener openings 70. Preferably, pairs of aligned fastener openings 70 penetrate the first tubular member 50 at a series of longitudinally-spaced locations adjacent each end of the lower track section 34.

More preferably, plural pairs of aligned fastener openings 70 penetrate the first tubular member . . . 50 at each such longitudinal location. In the embodiment shown in the Figures, each end of the lower track section 34 is characterized by two vertically-offset pairs of aligned fastener openings 70 at each of three longitudinally-spaced locations.

An elongate lower fin 72, preferably flat, projects externally from the first tubular member 50, and preferably extends in the second direction 58. Also preferably, the lower fin 72 extends within a vertical plane that is parallel to or coincident with a plane bounding the first tubular member 50.

More preferably, the lower fin 72 extends within a vertical plane that coincides with the front side wall 64 of the first tubular member 50. This vertical plane is laterally offset from the upright openings 68. The lower fin 72 also preferably extends in orthogonal relationship to the upper wall 60. More preferably, the lower fin 72 and the upper wall 60 are joined, and define an included angle of 90 degrees.

As noted above, the first tubular member 50 has the cross-sectional shape of a rectangle. When the lower fin 72 is viewed from the same cross-sectional perspective, the lower fin 72 extends from a corner of the rectangle.

The lower fin 72 and the front side wall 64 may be formed as a single piece, or may be formed as separate components that are joined by fasteners, welding or adhesive. A plurality of longitudinally-spaced and collinear fastener openings 74 are formed in the lower fin 72. Each of these openings 74 permits attachment of the lower fin 72 to a picket, as will be described hereafter.

The first raceway 48 has an elongate web 76, which is preferably flat. Laterally spaced first and second side walls 78 and 80 depend transversely from opposite edges of the web 76. Each of the side walls 78 and 80 is characterized by a body 82, which joins the web 76, and by a downwardly-projecting heel 84, which joins the base of the body 82.

Each of the side walls 78 and 80 is preferably flat, and preferably extends in orthogonal relationship to the web 76. The web 76 and side walls 78 and 80 cooperate to form the channel 52. The open and elongate mouth 54 is situated opposite the web 76. The first direction 56, in which the mouth 54 opens, preferably points toward the ground 86.

An elongate and shelf-like track 88 extends transversely into the channel 52 from each of the side walls 78 and 80, at a location intermediate the heel 84 and the web 76. Each track 88 is characterized by a flat surface 90 facing the web 76. The two tracks 88 are preferably coplanar, with each track 88 forming an included right angle with the side wall that it joins.

The first raceway 48 joins the first tubular member 50 at an interface bounded by the web 76 and the lower wall 62. In one embodiment, the web 76 constitutes a member distinct from the lower wall 62. In this embodiment, the web 76 and lower wall 62 may be joined by welding, adhesive or fasteners. Alternately, as shown in the Figures, the web 76 and the lower wall 62 are the same single member.

Figure 8:
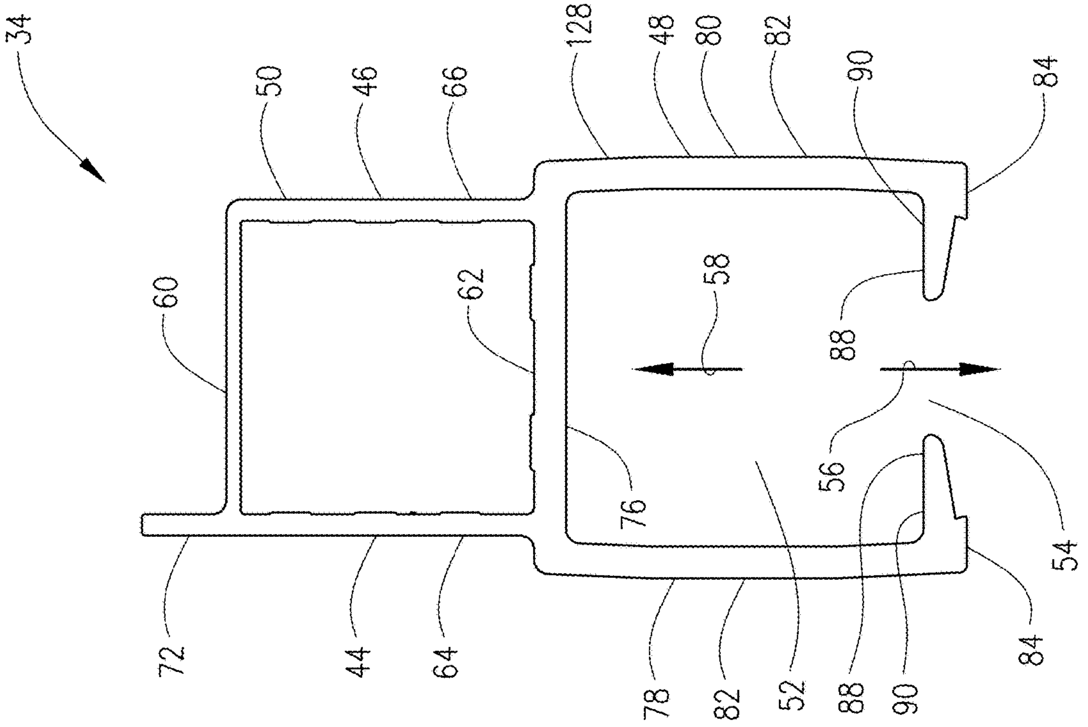
FIG. 8 is an end elevation view of a lower splicing element.

The lower splicing assembly 36 comprises at least one, and preferably a pair of lower splicing elements 92. Each lower splicing element 92 has opposed ends and a uniform cross-sectional shape and size along its length. When viewed from its end, as shown in FIG. 8, or in cross-section, the lower splicing element 92 has a hook-like shape characterized by a two-dimensional internal contour 94.

The internal contour 94 comprises a straight line 96 that includes a first free end 98. A recessed pan shape 100 joins the straight line 96 opposite the first free end 98. The pan shape 100 has a base 102 within which a minor protuberance 104 is formed. Preferably, the base 102 is at least slightly concave. Opposite the straight line 96, a bend 106 joins the pan shape 100. The bend 106 terminates in a second free end 108 and cooperates with the pan shape 100 to define a concavity 110 that opens toward the straight line 96.

In three-dimensional space, the lower splicing element 92 comprises an elongate and flat upper strip 112 that coincides with the straight line 96, an elongate trough 114 that coincides with the concavity 110, and an elongate ridge 116 that coincides with the protuberance 104. An elongate free edge 118 coincides with the second free end 108. The trough 114, ridge 116 and edge 118 extend in parallel, but laterally-offset, relationship to one another.

Adjacent each of its ends, the lower splicing element 92 is penetrated, at the upper strip 112, by at least one, and preferably of plurality of fastener openings 120. Preferably, plural fastener openings 120 penetrate the upper strip 112 of the lower splicing element 92 at each of a series of longitudinally-spaced locations adjacent each of its ends. More preferably, a pair of fastener openings 120 penetrate the lower splicing element 92 at each such longitudinal location.

Preferably, the fastener openings 120 in the upper strip 112 are provided at each end of the lower splicing element 92 in a number and pattern that matches the number and pattern of the fastener openings 70 provided at each end of the lower track section 34.

In the embodiment shown in the Figures, each end of the lower splicing element 92 is provided with two vertically-offset fastener openings 120 at each of three longitudinally-spaced locations.

This pattern registers with the pattern of fastener openings 70 provided at each end of the lower track section 34.

The two lower splicing elements 92 forming the lower splicing assembly 36 are preferably identical in all respects, except that one is formed as a mirror image of the other. In some embodiments, these mirror images may be fully identical.

FIG. 9 shows the interaction between two lower splicing elements 92 and a lower track section 34. At its upper strip 112, one lower splicing element 92 is sized and shaped to closely conform to the front side wall 64 of the first tubular member 50 of the lower track section 34. At its upper strip 112, the other lower splicing element 92 is sized and shaped to closely conform to the back side wall 66 of the first tubular member 50.

Each lower splicing element 92 is also configured so that the base 102 may be positioned in face-to-face relationship with one of the side walls 78 and 80, and in engagement with the ridge 116. However, the base 102 does not perfectly conform to its facing side wall. As a result, when engaged with a lower track section 34, the lower splicing element 92 is able to rock slightly about the ridge 116, which acts as a fulcrum.

At the concavity 110, each lower splicing element 92 is sized and shaped to receive the heel 84 of the side wall that engages the base 102. At the free edge 118, each lower splicing element 92 is sized and shaped to engage the underside of the track 88 of the side wall that engages the base 102.

Figure 10:
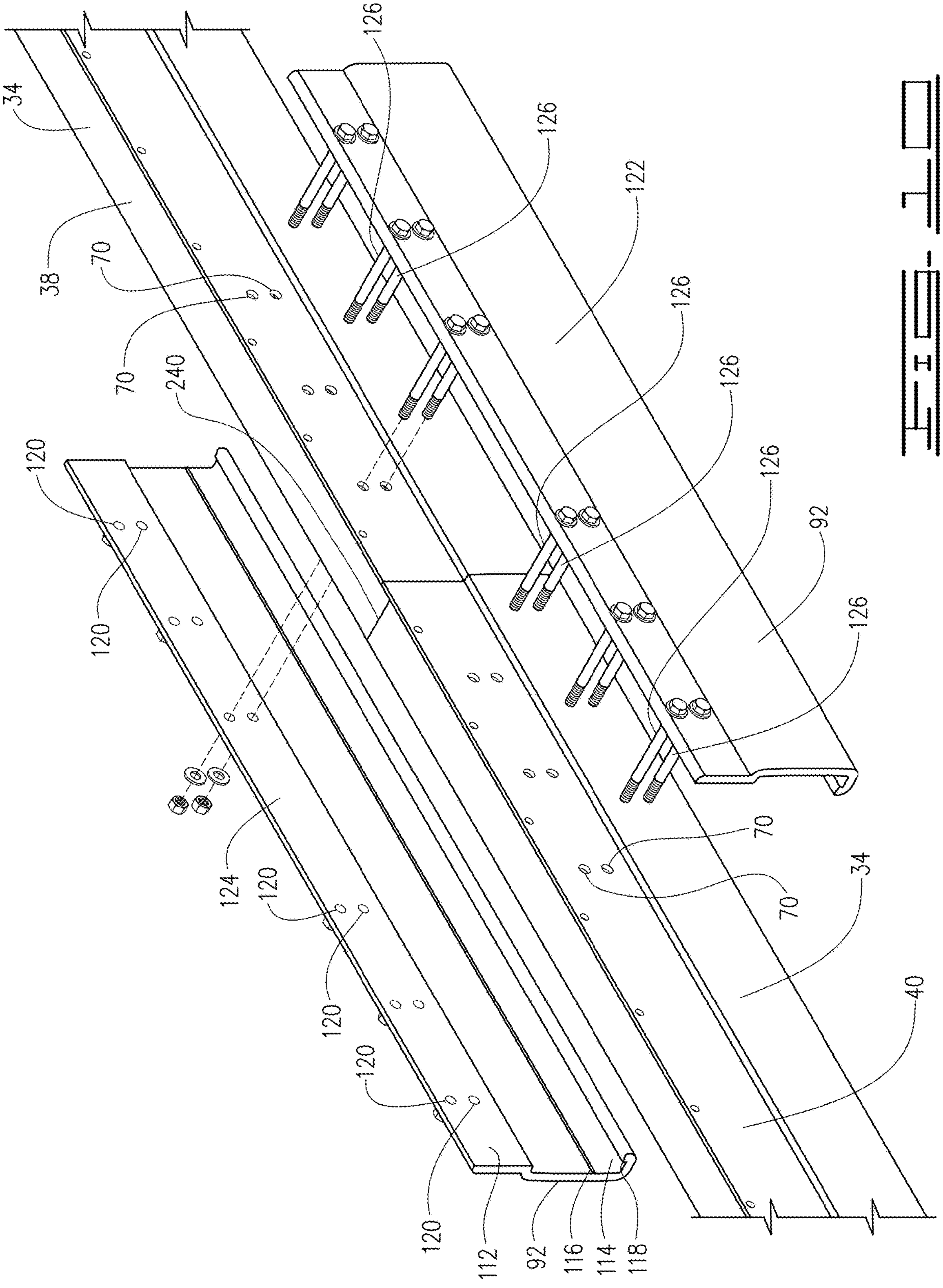
FIG. 10 is an exploded perspective view showing assembly of two lower splicing elements and two lower track sections.
Figure 11:
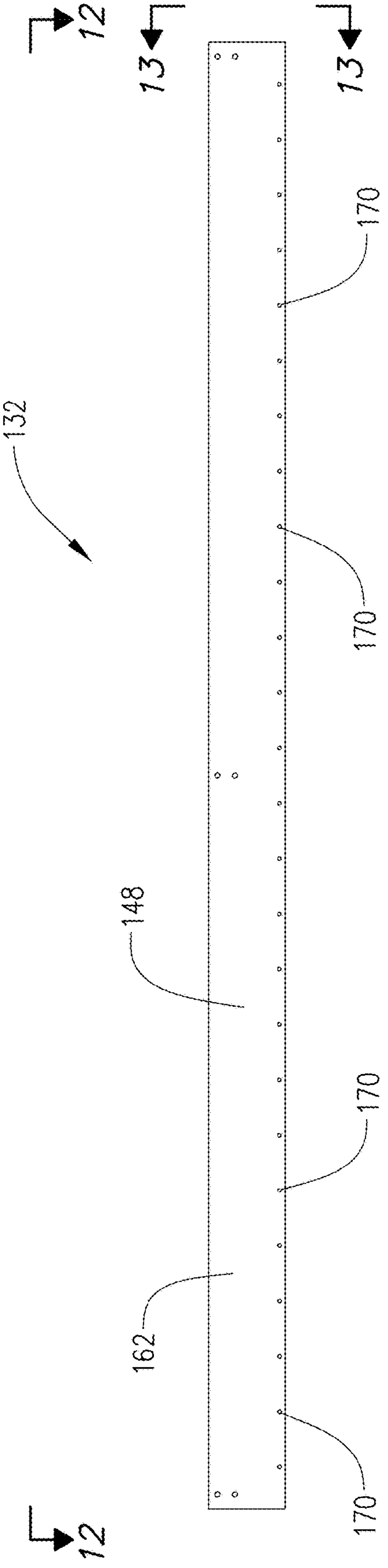
FIG. 11 is a front elevation view of an upper track section.

FIG. 10 illustrates assembly of first and second lower track sections 38 and 40 with first and second lower splicing elements 122 and 124. The heels 84 of the first side walls 78 of each lower track section 38 and 40 are inserted into the trough 114 of a first lower splicing element 122. The heels 84 of the second side walls 80 of each lower track section 38 and 40 are similarly inserted into the trough 114 of the second lower splicing element 124. When these steps are complete, the upper strip 112 should rest flush against the front side wall 64 of each lower track section. While the heels 84 remain within the troughs 114, the lower track sections 38 and 40 are brought into end-to-end engagement. Pairs of aligned fastener openings 70 in the lower track sections are aligned with corresponding pairs of fastener openings 120 in the lower splicing elements 122 and 124. Fasteners 126, such as bolts, are inserted through the aligned sets of openings and actuated so as to secure the lower splicing assembly 36 to the lower track sections 38 and 40, and thereby join the lower track sections 38 and 40.

Figure 25:
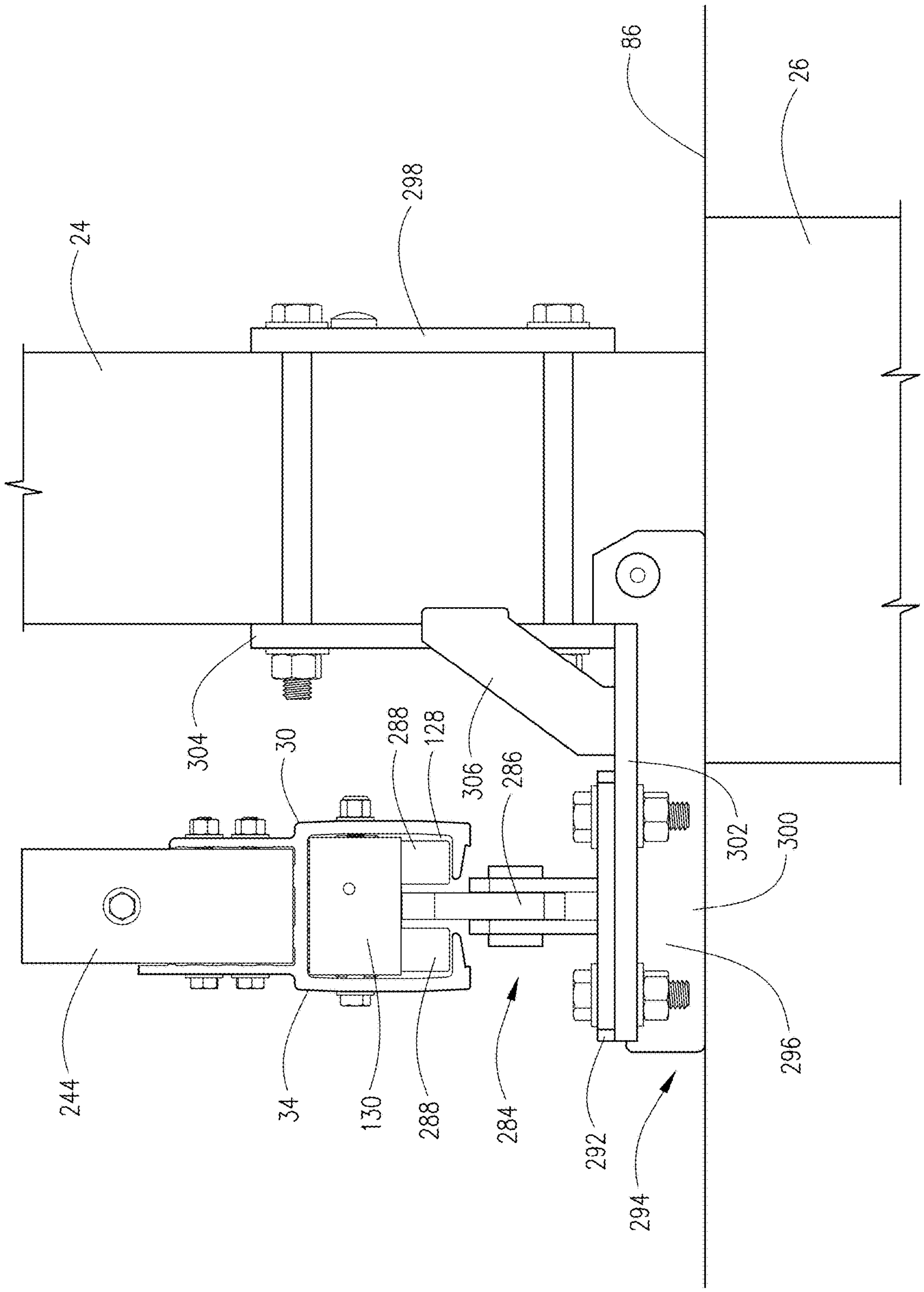
FIG. 25 is an end elevation view, similar to FIG. 24, showing a lower roller assembly positioned within a lower track. The lower roller assembly rests on a ground bracket installed on a gate post. The lower upper splicing element is omitted.

Additional lower track sections, if any, are incorporated into the lower track 30 in the same manner described with reference to the first and second lower track sections 38 and 40. Additional lower splicing assemblies, identical the lower splicing assembly 36, are provided for this purpose. In the assembled lower track 30, the raceways 48 of the aligned lower track sections 34 form an elongate lower roller raceway 128. The lower roller raceway 128 may be closed at either or both of its ends by a stop 130, shown in FIG. 25.

When the gate frame 28 is suspended from the gate posts 24, the weight of the upper portion of the gate frame 28 causes the body 82 of each side wall to rotate about its associated ridge 116, which acts as a fulcrum. This rotation causes the heel 84 to firmly engage the concavity 110, thereby reinforcing the connection between the lower track sections 38 and 40.

The upper track 32 is a rectilinear structure formed from at least one upper track section 132. In some embodiments, the upper track 32 may be formed from a plurality of upper track sections 132 arranged in end-to-end engagement. One instance where multiple upper track sections 132 may be provided is when a single upper track section 132 lacks sufficient length to span the gap 22.

If more than one upper track section 132 forms the upper track 32, then these upper track sections 132 preferably have identical cross-sectional shapes and identical cross-sectional sizes. An upper splicing element 134 joins each adjacent pair of upper track sections 132. If more than one upper splicing element 134 is included in the upper track 32, the upper splicing elements 134 are preferably identical.

In the embodiment shown in FIGS. 1-3, the upper track 32 is formed from three upper track sections 132. In a particular version of this embodiment, the first upper track section 136 has a length of 281.5 inches, the second upper track section 138 has a length of 142.5 inches, and the third upper track section 140 has a length of 186.5 inches.

As shown in FIGS. 11-14, each upper track section 132 is an elongate member having a uniform cross-sectional shape and size. Preferably, it is of single-piece construction. Each upper track section 132 defines a front side 142, which is relatively free of structure, and an opposed back side 144, where a second raceway 146 and a second tubular member 148 are formed. The second raceway 146 and the second tubular member 148 are preferably of equal length.

The second raceway 146 is an elongate structure having the shape of a channel 150. The mouth 152 of the channel 150 opens in a third direction 154, which is preferably identical to the first direction 56. The second tubular member 148 is an elongate structure that extends in parallel relationship to the second raceway 146. The second tubular member 148 is offset from the second raceway 146 in a fourth direction 156, which direction is orthogonal to the third direction 154. The upper track section 132 has a different cross-sectional shape than the lower track section 34.

The second tubular member 148 is characterized by an upper wall 158 and a vertically-offset lower wall 160. The upper and lower walls 158 and 160 are interconnected by a pair of laterally-offset and parallel side walls, namely front side wall 162 and back side wall 164. One side of the front side wall 162 faces the front side 142 of the upper track section 132, while the back side wall 164 is situated on the back side 144.

Figure 12:
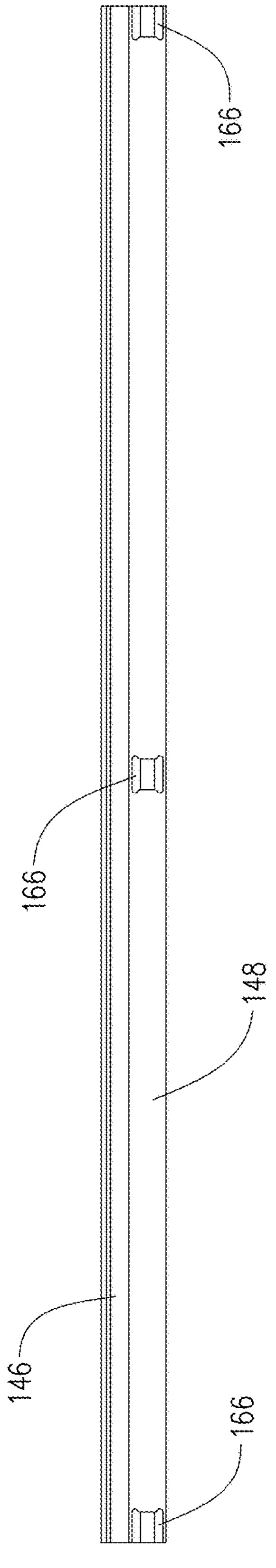
FIG. 12 is a top plan view of the upper track section shown in FIG. 11, taken along line 12-12.
Figure 4:
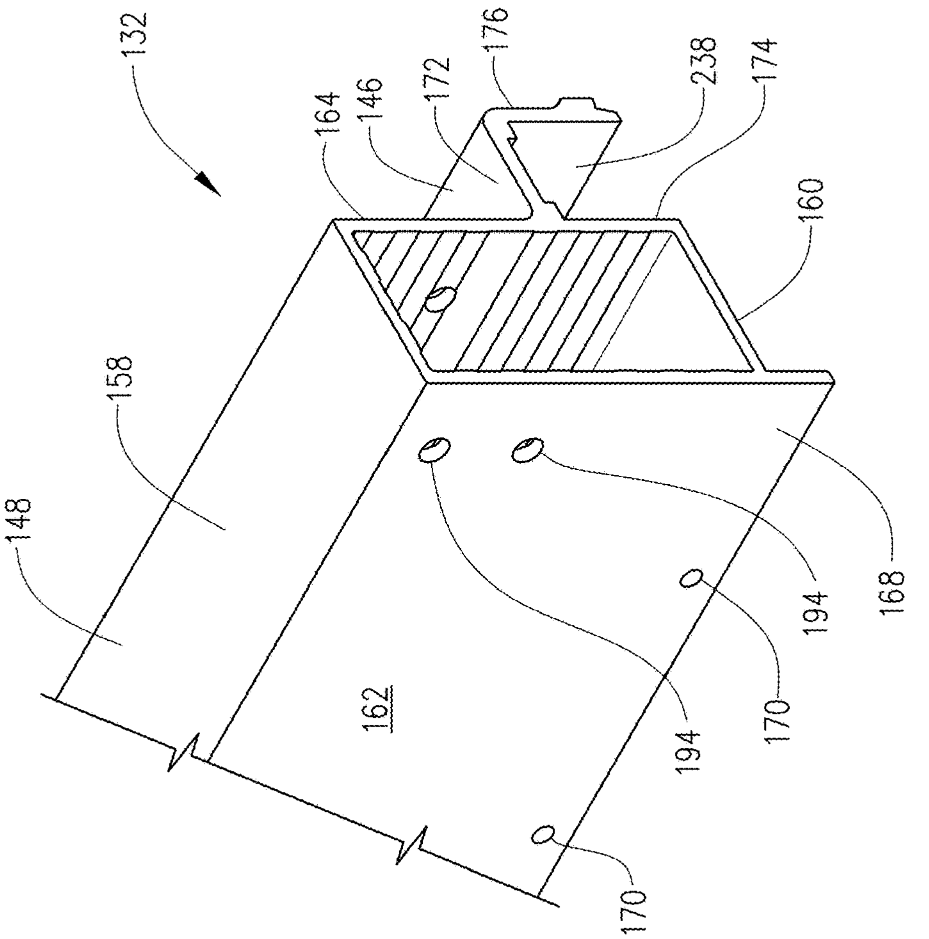
Figure 3:
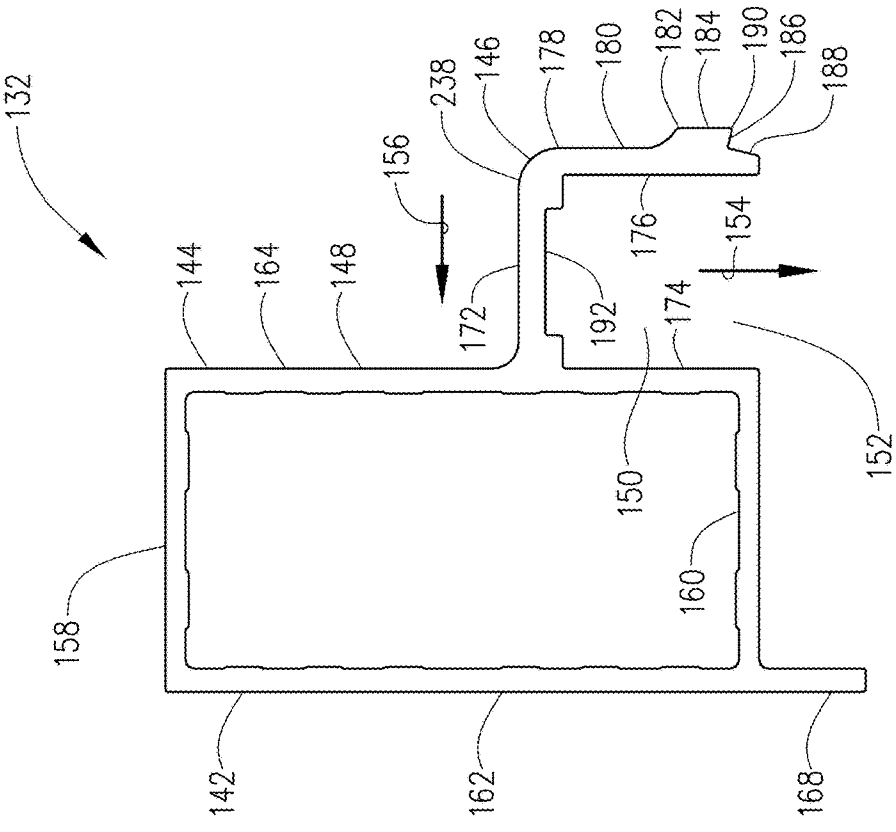

At least one upright opening 166 is formed in the lower wall 160 of the second tubular member 148. More preferably, a plurality of longitudinally-spaced and collinear upright openings 166 are formed in the lower wall 160 of the second tubular member 148, as shown in FIG. 12. Preferably, the upright openings 166 are of identical size and shape. More preferably the upright openings 166 have the same size and shape as the upright openings 68.

Figure 13:
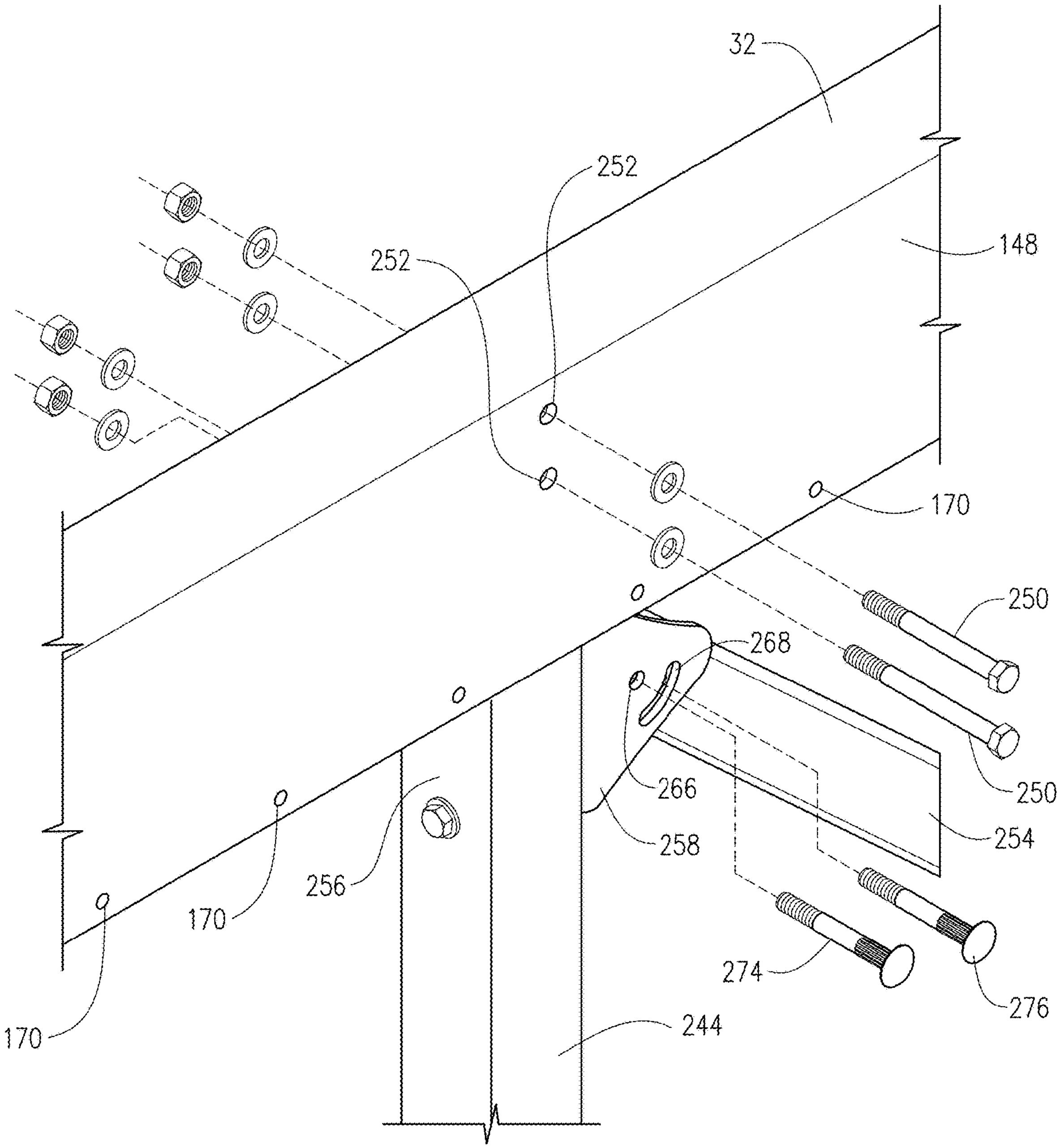
FIG. 13 is an end elevation view of the upper track section shown in FIG. 11, taken along line 13-13.

The upper wall 158, lower wall 160 and side walls 162 and 164, each of which are preferably substantially flat, cooperate to form a rectangular cross-sectional shape. As best shown in FIG. 13, the interior of the second tubular member 148 is preferably characterized by longitudinally-extending corrugations.

An elongate upper fin 168, preferably flat, projects externally from the second tubular member 148, and preferably extends in the third direction 154. Also preferably, the upper fin 168 extends within a vertical plane that is parallel to or coincident with a plane bounding the second tubular member 148.

More preferably, the upper fin 168 extends within a vertical plane that coincides with the front side wall 162 of the second tubular member 148. This vertical plane is laterally offset from the upright openings 166. The upper fin 168 also preferably extends in orthogonal relationship to the upper wall 158. More preferably, the upper fin 168 and the upper wall 158 are joined, and define an included angle of 90 degrees.

As noted above, the second tubular member 148 has the cross-sectional shape of a rectangle. When the upper fin 168 is viewed from the same cross-sectional perspective, the upper fin 168 extends from a corner of the rectangle.

The upper fin 168 and the front side wall 162 may be formed as a single piece, or may be formed as separate components that are joined by fasteners, welding or adhesive. A plurality of longitudinally-spaced and collinear fastener openings 170 are formed in the upper fin 168. Each of these openings 170 permits attachment of the upper fin 168 to a picket, as will be described hereafter.

The second raceway 146 has an elongate web 172, which is preferably flat. Elongate and laterally-spaced inner and outer side walls 174 and 176 extend transversely from the web 172. The web 172 and side walls 174 and 176 cooperate to form the channel 150. The open and elongate mouth 152 is situated opposite the web 172. The third direction 154, in which the mouth 152 opens, preferably points toward the ground 86.

The inner side wall 174 is preferably flat, and extends in orthogonal relationship to the web 172. The outer side wall 176 comprises a body 178, which is preferably flat in the region 180 nearest to the web 172. This flat region 180 is likewise preferably orthogonal to the web 172. The body 178 of the outer side wall 176 includes an overhanging projection 182 that extends outside the footprint of the rest of the upper track section 132. The projection 182 has a flat face 184 that preferably extends in parallel, but laterally-offset relationship to the flat region 180. Preferably, the face 184 also extends in parallel and laterally-offset relationship to the inner side wall 174. The projection 182 further comprises a base 186, also preferably flat, that joins the face 184 on the side opposite the flat region 180. Preferably, the base 186 forms an acute included angle with the face 184.

A downwardly-projecting heel 188 joins the body 178 at the projection 182, and more particularly joins the projection 182 at the base 186. Preferably, the base 186 forms an obtuse included angle with the heel 188. Opposite the heel 188, the base 186 terminates in an elongate edge 190.

In the embodiment shown in the Figures, those portions of the channel 150 formed by the side walls 174 and 176 are preferably flat. Those portions of the channel 150 formed by the web 172 are likewise preferably flat, except for an elongate notch 192.

The second raceway 146 joins the second tubular member 148 at an interface bounded by the back side wall 164 and the inner side wall 174. In one embodiment, the joined inner side wall 174 constitutes a member distinct from the joined back side wall 164. In this embodiment, the side walls 164 and 174 may be joined by welding, adhesive or fasteners. Alternately, as shown in the Figures, the inner side wall 174 and the back side wall 164 are the same single member. Preferably, the mouth 152 of the second raceway 146 and the lower wall 160 of the second tubular member 148 are disposed in coplanar relationship. The web 172 of the second raceway 146 and the upper wall 158 of the second tubular member 148 are disposed in non-coplanar, vertically-offset and preferably parallel relationship. Preferably, the separation distance between the upper and lower walls 158 and 160 exceeds the separation distance between the web 172 and the mouth 152.

Adjacent each end of the upper track section 132, the second tubular member 148 is penetrated, at the upper portions of the side walls 162 and 164, by aligned pairs of fastener openings 194. The aligned fastener openings 194 define a path that clears the second raceway 146, and overlies the web 172. Preferably, pairs of aligned fastener openings 194 penetrate the second tubular member 148 at each of a series of longitudinally-spaced locations adjacent each end of the upper track section 132. More preferably, plural pairs of aligned fastener openings 194 penetrate the second tubular member 148 at each such longitudinal location. In the embodiment shown in the Figures, each end of the upper track section 132 is characterized by two vertically-offset pairs of aligned fastener openings 194 at each of three longitudinally-spaced locations.

Figure 15:
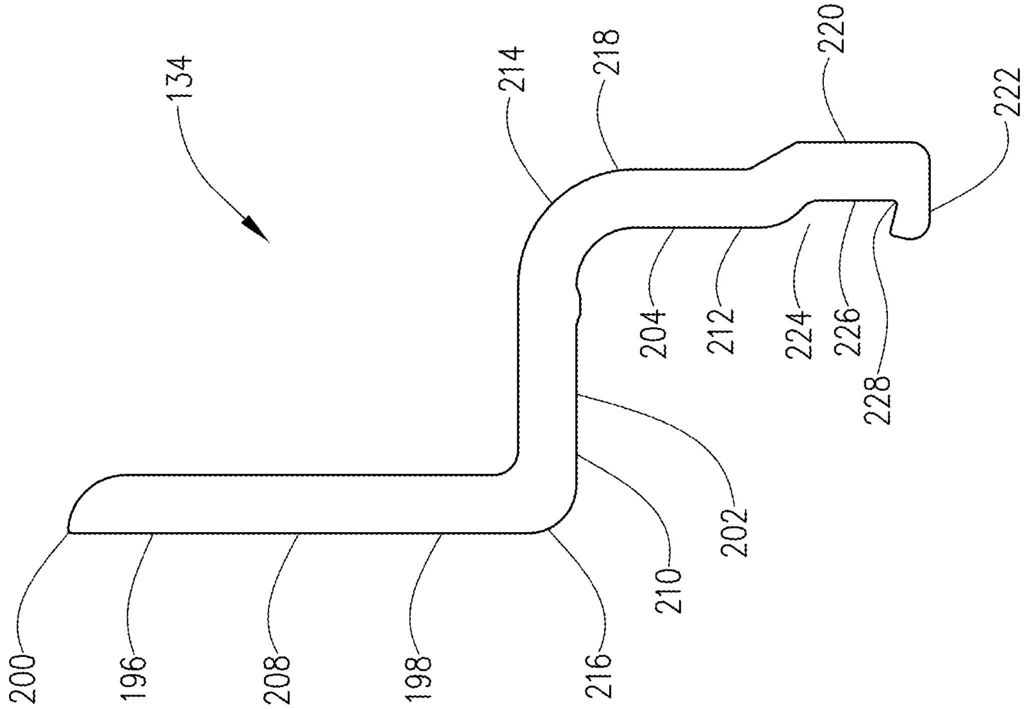
FIG. 15 is an end elevation view of an upper splicing element.

The upper splicing element 134 has opposed ends and a uniform cross-sectional shape and size along its length. When viewed from its end, as shown in FIG. 15, or in cross-section, the upper splicing element 134 has a stairstep shape characterized by a two-dimensional internal contour 196.

The internal contour 196 comprises a straight first riser 198 that includes a first free end 200. Further comprising the internal contour 196 is a straight tread 202 that joins the first riser 198 opposite the first free end 200. Preferably, the tread 202 extends orthogonally to the first riser 198. Further comprising the internal contour 196 is a second riser 204 that joins the tread 202 opposite the first riser 198. The second riser 204 extends in offset relationship to the first riser 198. Opposite the tread 202, the second riser 204 terminates in a second free end 206. In three-dimensional space, the upper splicing element 134 comprises an elongate and flat first riser strip 208 that coincides with the first riser 198, an elongate and flat tread strip 210 that coincides with the tread 202, and an elongate second riser strip 212 that coincides with the second riser 204. The upper splicing element 134 is also characterized by an outer surface 214 and an opposed inner surface 216.

The second riser strip 212 comprises an upper section 218, a lower section 220 and a lip 222. The upper section 218 is an elongate and flat structure that joins the tread strip 210 opposite the first riser strip 208, and extends parallel to the first riser strip 208. The lower section 220 is an elongate and flat structure that extends in parallel and outwardly-offset relationship to the upper section 218.

The lip 222 joins the lower section 220 opposite the upper section 218. The lower section 220 and the lip 222 cooperate to define an elongate recess 224 in the inner surface 216. Preferably, the recess 224 includes a flat base 226 that extends in parallel relationship to the first riser strip 208. The recess 224 includes a corner 228 bounded on one side by the base 226. The corner 228 preferably defines a 90-degree included angle.

Figure 16:
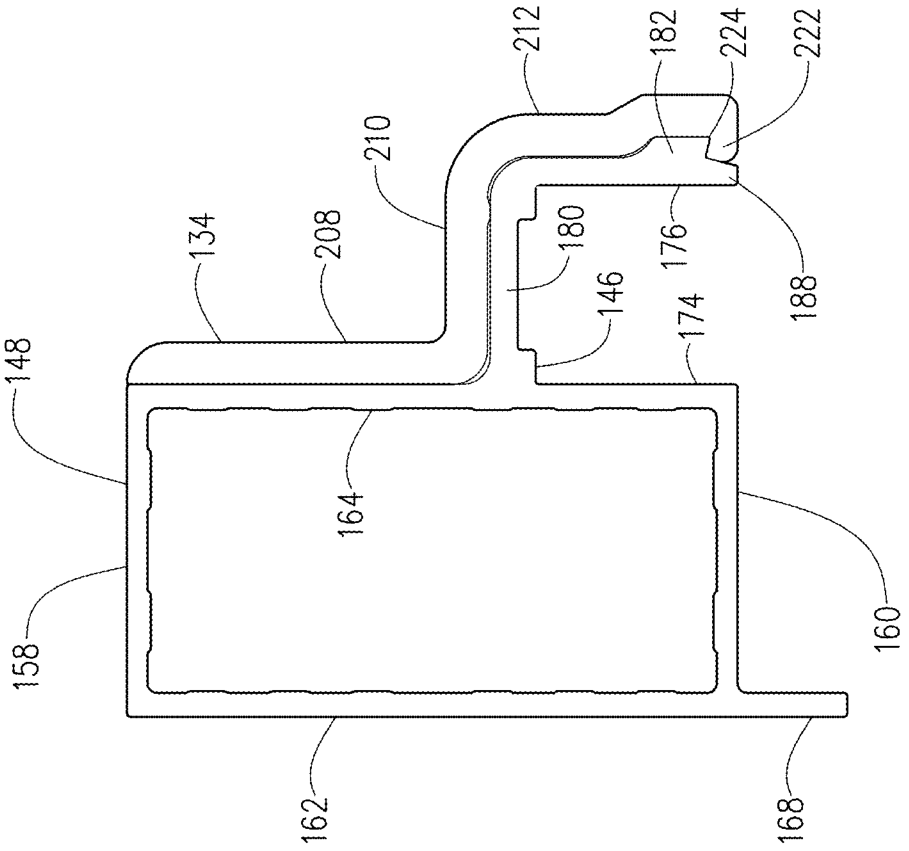
FIG. 16 is an end elevation view of an upper splicing element assembled with an upper track section.

FIG. 16 illustrates the interaction between the upper splicing element 134 and the upper track section 132. At the first riser strip 208, the upper splicing element 134 is sized and shaped to closely conform to the back side wall 164 of the second tubular member 148. At the tread strip 210, the upper splicing element 134 is sized and shaped to closely conform to the web 172 of the second raceway 146. At the second riser strip 212, the upper splicing element 134 is sized and shaped to closely conform to the flat region 180 of the second raceway 146.

The upper splicing element 134 is also configured so that the projection 182 of the upper track section 132 may be received within the recess 224. When so received, the face 184 engages the base 226 in a flush relationship. The edge 190 engages the corner 228 of the recess 224, and the heel 188 is engageable with the lip 222. However, the projection 182 does not perfectly conform to the shape of the recess 224. As a result, when engaged with an upper track section 132, the upper splicing element 134 is able to rock slightly about the edge 190, which acts as a fulcrum. Adjacent each of its ends, at the first riser strip 208, the upper splicing element 134 is penetrated by at least one, and preferably of plurality of fastener openings 230, shown in FIG. 17. Preferably, fastener openings 230 penetrate the upper splicing element 134 at a series of longitudinally-spaced locations adjacent each of its ends. More preferably, a plurality of fastener openings 230 penetrate the upper splicing element 134 at each such longitudinal location.

Preferably, the fastener openings 230 are provided at each end of the upper splicing element 134 in a number and pattern that matches the number and pattern of the fastener openings 194 provided at each end of the upper track section 132. In the embodiment shown in the Figures, each end of the upper splicing element 134 is provided with two vertically-offset pairs of fastener openings 230 at each of three longitudinally-spaced locations. This pattern registers with the pattern of fastener openings 194 provided at each end of the upper track section 132.

Figure 17:
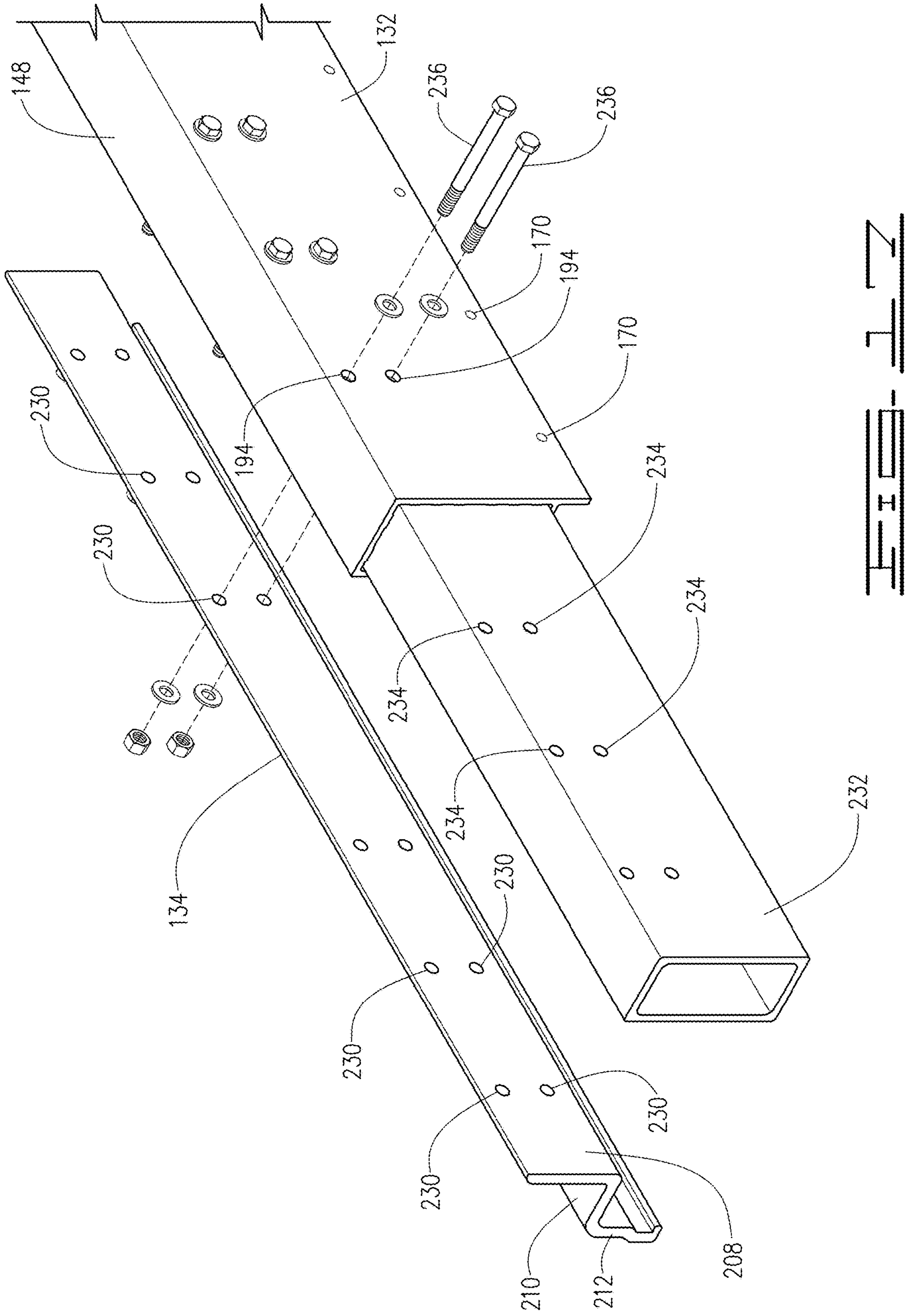
FIG. 17 is an exploded perspective view showing assembly of an upper splicing element and an upper track section.

As shown in FIG. 17, an internal splicing block 232 is closely but clearingly receivable within the second tubular member 148 of the upper track section 132. The splicing block 232 is a hollow structure having a shape that conforms to the shape of the second tubular member 148. In the embodiment shown in the Figures, the splicing block 232 is shaped as a rectangular prism. At each end of the splicing block 232, in its opposed sides, aligned pairs of fastener openings 234 are formed. The number and pattern of the fastener openings 234 registers with the number and pattern of the fastener openings 194 provided at each end of the upper track section 132, and with the number and pattern of the fastener openings 230 in each end of the upper splicing element 134.

FIG. 17 illustrates splicing of the upper track sections. One end of the splicing block 232 is inserted into a first upper track section 136, and the opposite end of the same splicing block 232 is inserted into a second upper track section 138 (not shown in FIG. 17). The two upper track sections are brought into end-to-end engagement, and the fastener openings 194 and 234 aligned at each upper track section. The upper splicing element 134 is brought into contact with the engaged upper track sections.

One end of the upper splicing element 134 contacts the first upper track section 136, while the other end contacts the second upper track section 138. At the first riser strips 208, the upper splicing element 134 rests flush against the back side walls 164 of the second tubular members 148. At the tread strips 210, the upper splicing element 134 rests flush against the webs 172 of the second raceways 146. At the second riser strips 212, the upper splicing element 134 engages the outer side walls 176 of the second raceways 146.

The fastener openings 230 of the upper splicing element 134 are brought into alignment with the corresponding fastener openings 194 and 234. Fasteners 236, such as bolts, are inserted through the aligned sets of openings and actuated so as to secure the upper splicing element 134 to the upper track sections 136 and 138. Each fastener 236 extends through an upper track section, the splicing block 232 and the upper splicing element 134.

Additional upper track sections, if any, are incorporated into the upper track 32 in the same manner described with reference to the first and second upper track sections 136 and 138.

Additional upper splicing elements and splicing blocks, identical to the upper splicing elements 134 and splicing blocks 232, are provided for this purpose. In the assembled upper track 32, the raceways 146 of the aligned upper track sections 132 form an elongate upper roller raceway 238. The upper roller raceway 238 may be closed at either or both of its ends by a stop (not shown). When the gate frame 28 is suspended from the gate posts 24, the weight of the gate frame 28 causes the body 178 of each outer side wall 176 to rotate about its associated edge 190, which acts as a fulcrum. This rotation causes the heel 188 to firmly engage the lip 222, thereby reinforcing the connection between the upper track sections 136 and 138.

If both the lower and upper tracks 30 and 32 include splices, then any splice 240 in the lower track 30 is preferably longitudinally offset from any splice 242 in the upper track 32, as shown in FIG. 2. Such an arrangement of splices enhances the structural strength of the gate frame 28. Components of the lower and upper tracks 30 and 32 are preferably formed from a strong, durable and lightweight material, such as aluminum. In one embodiment, each lower track section 34 has a maximum height of 7.3125 inches and a maximum width of 3.75 inches. Each upper track section 132 has a maximum height of 6.5625 inches and a maximum width of 5.25 inches. For a gate frame 28 adapted to span a gap 22 of 36 feet, the length of each of the tracks 30 and 32 is 610.5 inches. The tracks 30 and 32 are formed from 6005-T5 aluminum alloy. In the assembled gate frame 28, the tubular members 50 of the lower track 30 underlie and are aligned with the tubular members 148 of the upper track 32. The front side walls 64 and lower fins 72 of the lower track 30 are respectively coplanar with the front side walls 162 and upper fins 168 of the upper track 32. In one embodiment, the separation distance between the mouth 54 of the first raceway 48 of the lower track section 34 and the upper wall 158 of the second tubular member 148 of the upper track section 132 is 11.5 feet.

As shown in FIG. 2, the gate frame 28 further comprises a plurality of upright members 244 arranged in longitudinally-spaced and preferably collinear relationship along the gate frame 28.

The upright members 244, which are preferably tubular, rectilinear and identical, interconnect the lower and upper tracks 30 and 32. Each upright member 244 extends in transverse, and more preferably orthogonal, relationship to the tracks 30 and 32.

Each upright member 244 is preferably formed from a strong, durable and lightweight material, such as 16 gauge pregalvanized steel. In one embodiment, the upright member 244 has a square cross-sectional shape, with each side having a width of 2.5 inches, and a length of 102.8125 inches.

Figure 18:
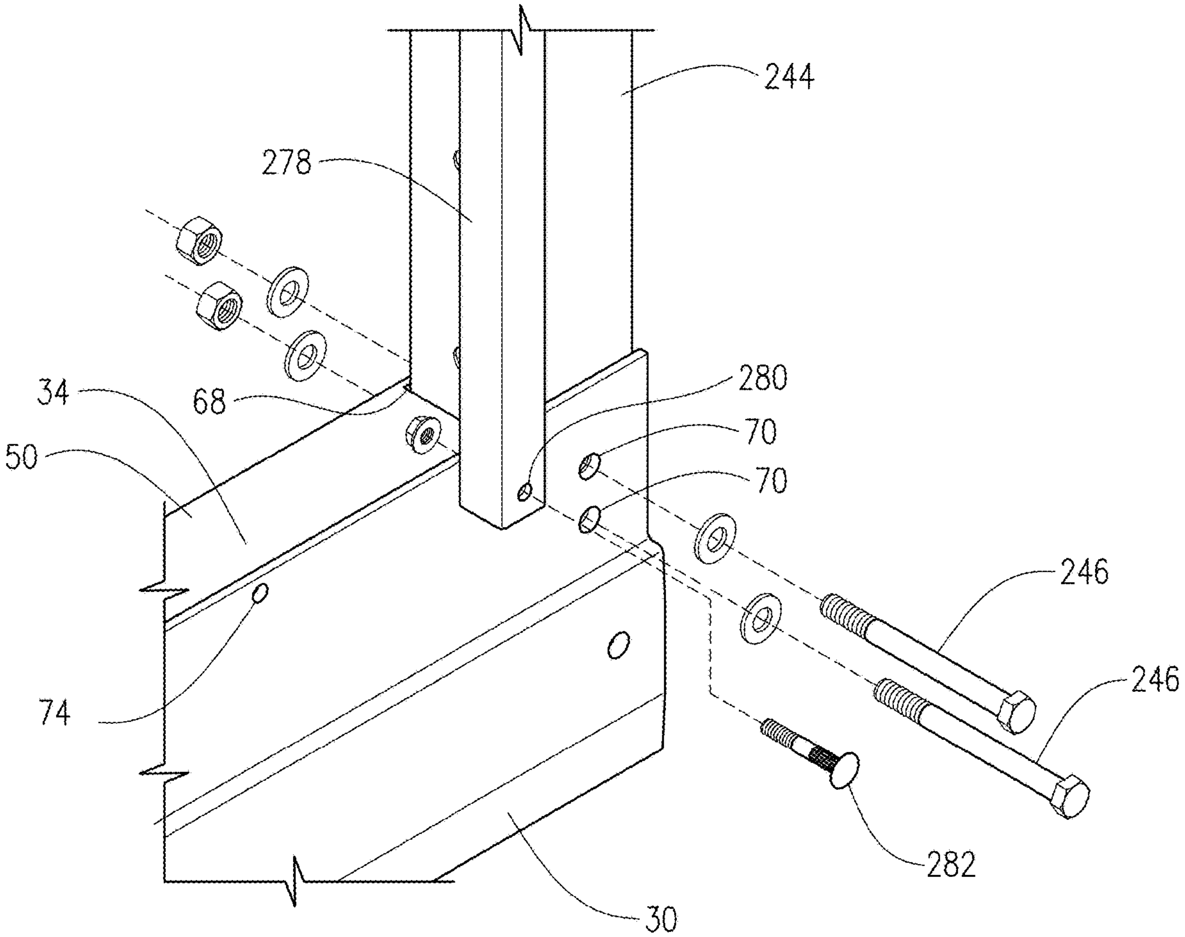
FIG. 18 is an exploded perspective view showing one end of a lower track section and its assembly with an upright member and a picket.

FIG. 18 shows installation of an upright member 244 at the lower track 30. The lower end of the upright member 244 is received through one of the upright openings 68 of a lower track section 34, and is thereby seated within the first tubular member 50. One or more fasteners 246, such as bolts, connect the lower portion of each upright member 244 to the lower track section 34, and thus to the lower track 30.

Each fastener 246 extends through the paired fastener openings 70 in the first tubular member 50, and through another pair of fastener openings (not shown) formed in opposed walls of the lower portion of the upright member 244. Once actuated, each fastener 246 connects the upright member 244 to a lower track section 34. In the embodiment shown in the Figures, two fasteners 246 are used to secure the lower portion of each upright member 244 to a lower track section 34. FIG. 19 shows installation of an upright member 244 at the upper track 32. The upper end of an upright member 244 is received through one of the upright openings 166 of an upper track section 132, and is thereby seated within the second tubular member 148. One or more fasteners 250, such as bolts, connect the upper portion of each upright member 244 to the upper track section 132, and thus to the upper track 32.

Each fastener 250 extends through an aligned pair of fastener openings 252 formed in the second tubular member 148, and through another pair of fastener openings (not shown) formed in opposed walls of the upper portion of the upright member 244. Once actuated, each fastener 250 connects the upright member 244 to an upper track section 132. In the embodiment shown in the Figures, two fasteners 250 are used to secure the upper portion of each upright member 244 to an upper track section 132.

The gate frame 28 further comprises a plurality of elongate diagonal members 254, shown in FIG. 2. The diagonal members 254 are preferably tubular, rectilinear and identical. Each is preferably formed from a strong, durable and lightweight material, such as 16 gauge pregalvanized steel. In one embodiment, the diagonal member 254 has a square cross-sectional shape, with each side having a width of 2.0 inches, and a length of 114.8 inches.

Each diagonal member 254 interconnects an adjacent pair of upright members 244, while forming a non-straight and non-right angle in relation to each of these upright members 244. Preferably, each diagonal member 254 extends from an upper region 256 of one upright member 244 to a lower region of a next adjacent upright member 244.

In one embodiment, upright members 244 to which a diagonal member is connected at its upper region alternate with upright members 244 to which a diagonal member is connected at its lower region. In such an embodiment, each upright member is connected to two diagonal members 254, one at an upper region and the other at a lower region. Other arrangements of diagonal members 254 are possible. For example, in the embodiment shown in FIG. 2, two diagonal members 254 are attached to the upper portion of the same upright member 244.

Figure 20:
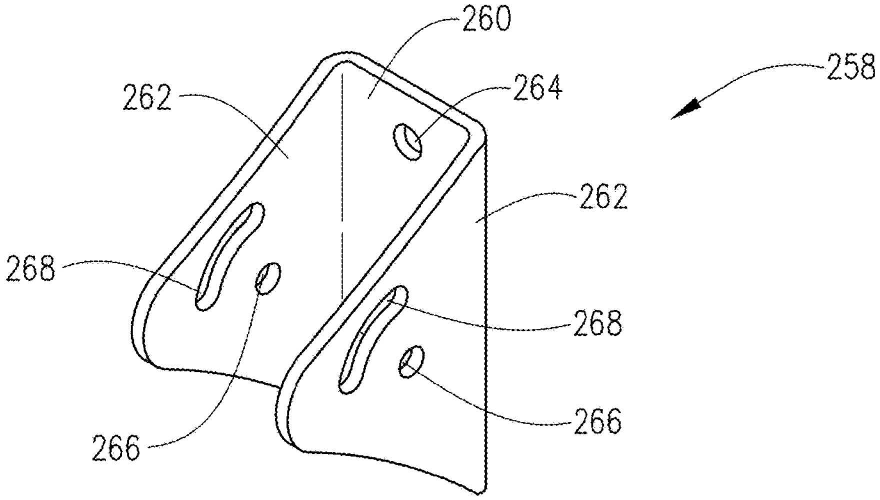
FIG. 20 is a perspective view of a diagonal bracket.

A diagonal bracket 258, shown in FIG. 20, is used to interconnect an end of a diagonal member 254 to an upright member 244. The diagonal bracket 258 is a channel-shaped structure having a flat base 260. Preferably, the shape of the base 260 is rectangular. A pair of identical side walls 262, both flat, extend from opposite edges of the same side of the base 260. Preferably, the side walls 262 extend in parallel relationship to each other, and in orthogonal relationship to the base 260. Each side wall 262 is generally bell-shaped, with each bell shape joining the base 260 at its mouth.

A pair of spaced first fastener openings 264 is formed in the base 260. Formed in the side walls 262 are an aligned pair of compact second fastener openings 266, and an aligned pair of elongate and curved third fastener openings 268. Changes in the length and longitudinal spacing of the upright members 244 can require changes in the angular orientation of diagonal members 254. The elongate and curved shape of the third fastener openings 268 permits the same diagonal bracket 258 to be used with diagonal members 254 having a range of angular orientations relative to the upright members 244.

Figure 21:
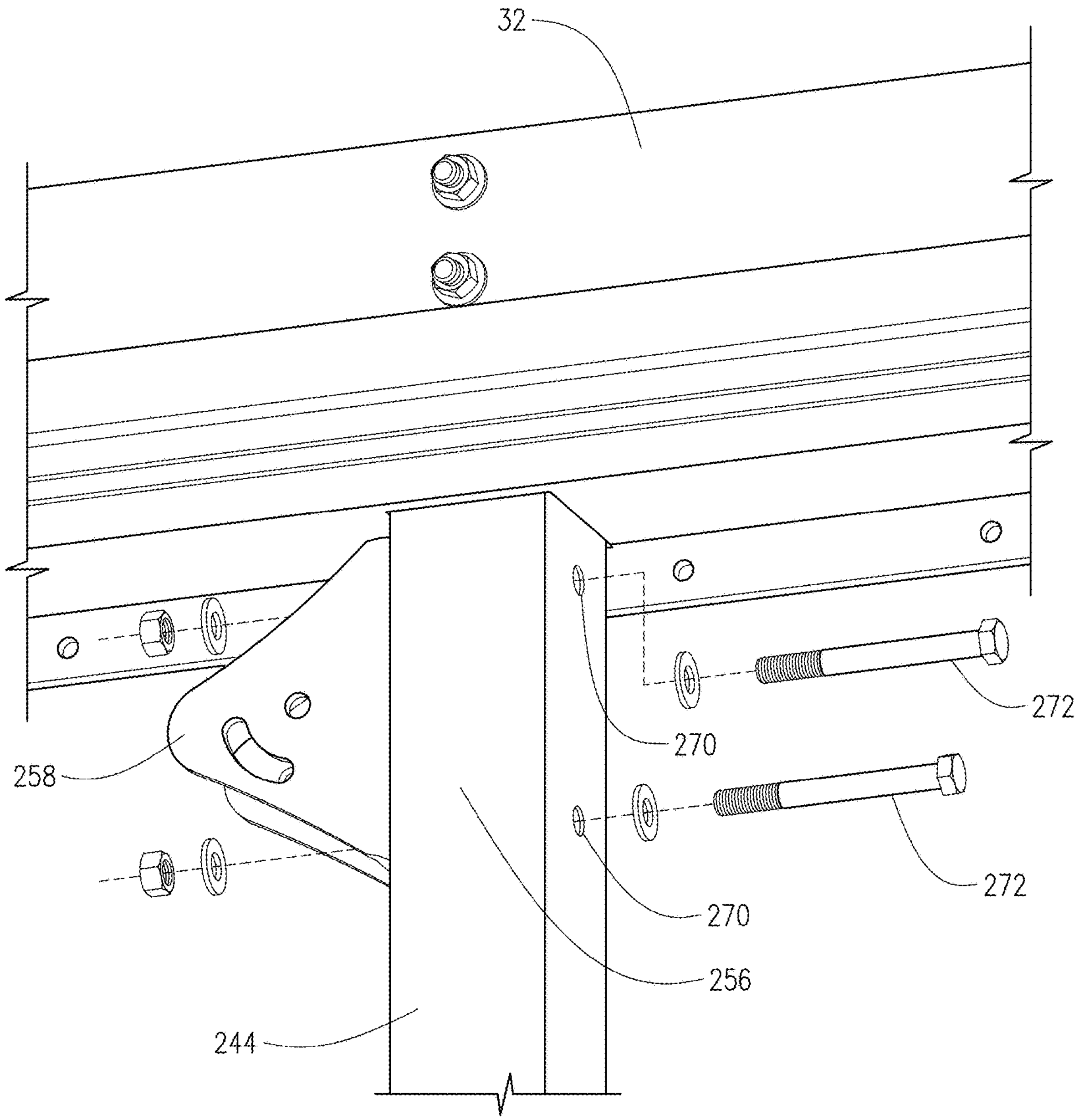
FIG. 21 is an exploded perspective view of a portion of an upper track section, showing the upper portion of an installed upright member its assembly with a diagonal bracket.

Installation of a diagonal bracket 258 at an upper region 256 of an upright member 244 is shown in FIG. 21. The upper region 256 is situated adjacent to, but outside of, the upper track 32. The base 260 engages a face of the upright member 244. In the opposite face, a pair of fastener openings 270 register with the first fastener openings 264 in the base 260. First fasteners 272 are inserted through the aligned openings 270 and 264 and actuated, thereby securing the diagonal bracket 258 to the upright member 244.

Installation of a diagonal bracket at a lower region of an upright member 244, adjacent to, but outside of, the lower track 30, proceeds in the same manner described with reference to FIG. 21. When a diagonal member 254 will interconnect an adjacent pair of upright members 244, the channels of the diagonal brackets 258 that will hold that diagonal member 254 should open toward one another.

Installation of the upper end of a diagonal member 254 in a diagonal bracket 258 is shown in FIG. 19. A second fastener 274, such as a bolt, is inserted through the second fastener openings 266 and an aligned pair of openings (not shown) formed in the diagonal member 254. A third fastener 276, such as a bolt, is inserted through the third fastener openings 268 and another aligned pair of openings (not shown) formed in the diagonal member 254. The second and third fasteners 274 and 276 are actuated, thereby securing the upper end of the diagonal member 254 to the diagonal bracket 258. Installation of the end of a diagonal member 254 to a diagonal bracket 258 installed on a lower region of an upright member 244 proceeds in the same manner as described with reference to FIG. 21.

The gate frame 28 further comprises a plurality of elongate pickets 278 arranged in longitudinally-spaced and preferably collinear relationship along the gate frame 28, as shown in FIG. 2. The pickets 278 are preferably tubular, rectilinear along most or all of their length, and identical. Each picket 278 preferably has a lesser circumference than that of any of the upright members 244. Preferably, a pair of aligned fastener openings 280 penetrate each picket 278 adjacent each of its ends.

Each picket 278 is preferably formed from a strong, durable and lightweight material, such as pregalvanized steel. In one embodiment, each picket 278 has a square cross-sectional shape, with each side having a width of 0.75 inches, and a length of 108.5 inches.

The pickets 278 are oriented vertically, and extend in parallel relationship to the upright members 244. The pickets 278 also extend in transverse, and more preferably orthogonal, relationship to the tracks 30 and 32. Preferably, points corresponding to the uppermost extent of the pickets 278 are collinear.

Lateral spacing of pickets 278 on the gate frame 28 is preferably uniform. In one embodiment, adjacent pickets 278 have a separation distance of 3.75 inches. Pickets 278 may, but need not, be installed, on those portions of the gate frame 28 that do not face the gap 22.

The pickets 278 are secured to the gate frame 28 at the back side 46 of the lower track 30 and at the back side 144 of the upper track 32. FIG. 18 shows connection of a picket 278 to the lower . . . track 30. At the picket's lower end, the fastener openings 280 are brought into alignment with one of the fastener openings 74 in the lower fin 72. A fastener 282, such as a bolt, is inserted into the aligned openings and actuated. Connection of the same picket 278 to the upper track 32 proceeds similarly, at the upper fin 168 and fastener opening 170. Additional pickets 278 are installed in like manner.

At the lower track 30, the pickets 278 are situated on the opposite side of the lower fin 72 from the upright members 244. At the upper track 32, the pickets 278 are similarly situated on the opposite side of the upper fin 168 from the upright members 244. The pickets 278 are connected to the lower track 30 only at the lower fin 72, and to the upper track 32 only at the upper fin 168. No portion of any picket 278 extends within either of the tubular members 50 and 148.

Preferably, pickets 278 are installed on that portion of that gate frame 28 that blocks the gap 22 when the gate assembly 10 is in a closed position, as shown in FIG. 2. Pickets 278 need not be installed on the tail portion of the gate frame 28, which remains outside of the gap 22 even when the gate assembly 10 is closed.

In another embodiment, not shown in the Figures, the pickets 278 may be replaced with one or more sheets of infill material, such as a fencing fabric. The fencing fabric is connected to the tracks 30 and 32 at the fins 72 and 168.

Figure 22:
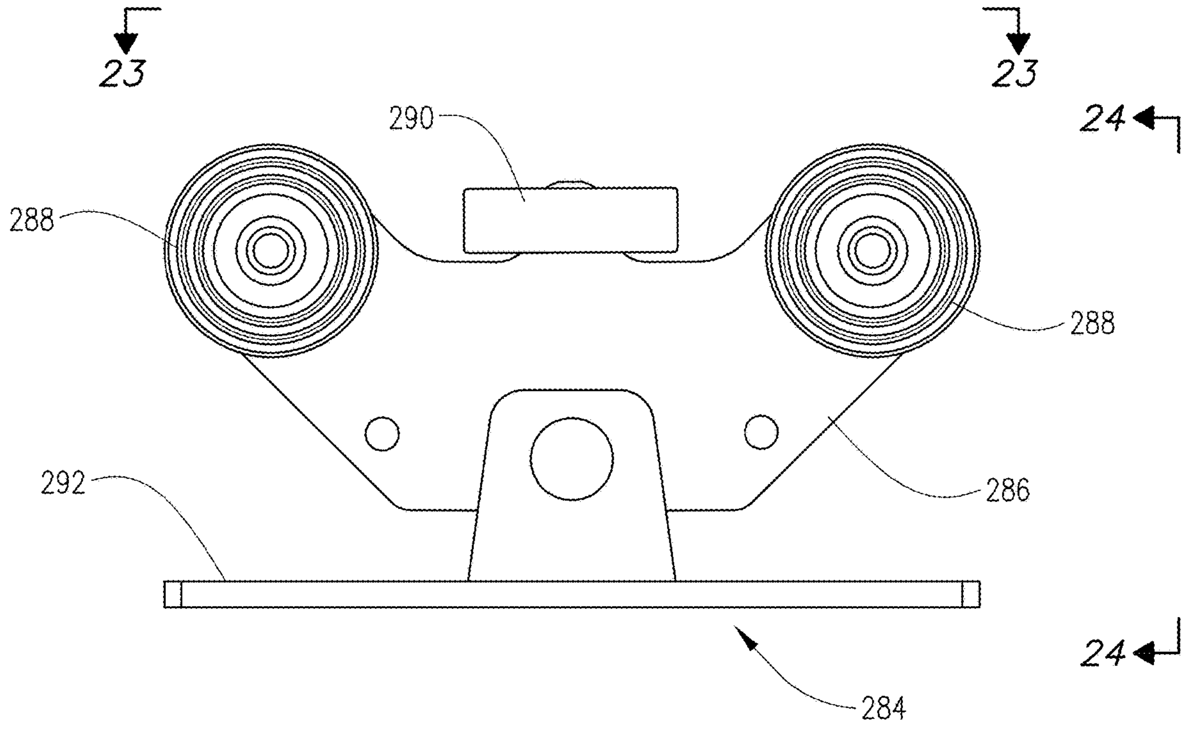
FIG. 22 is a front elevation view of a lower roller assembly.
Figure 23:
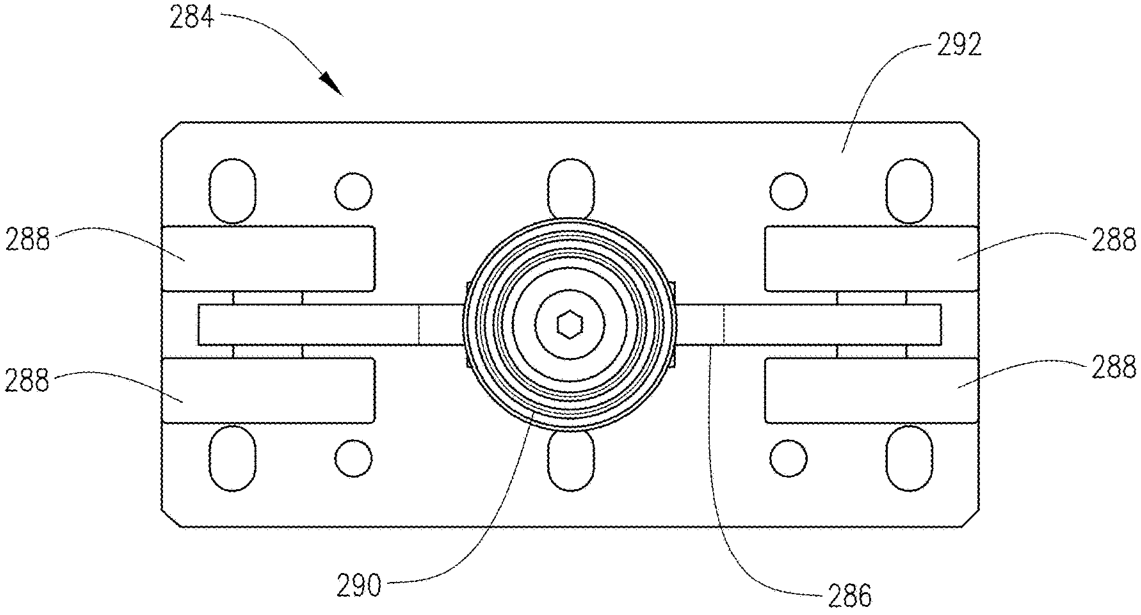
FIG. 23 is a top plan view of the lower roller assembly shown in FIG. 22, taken along line 23-23.
Figure 24:
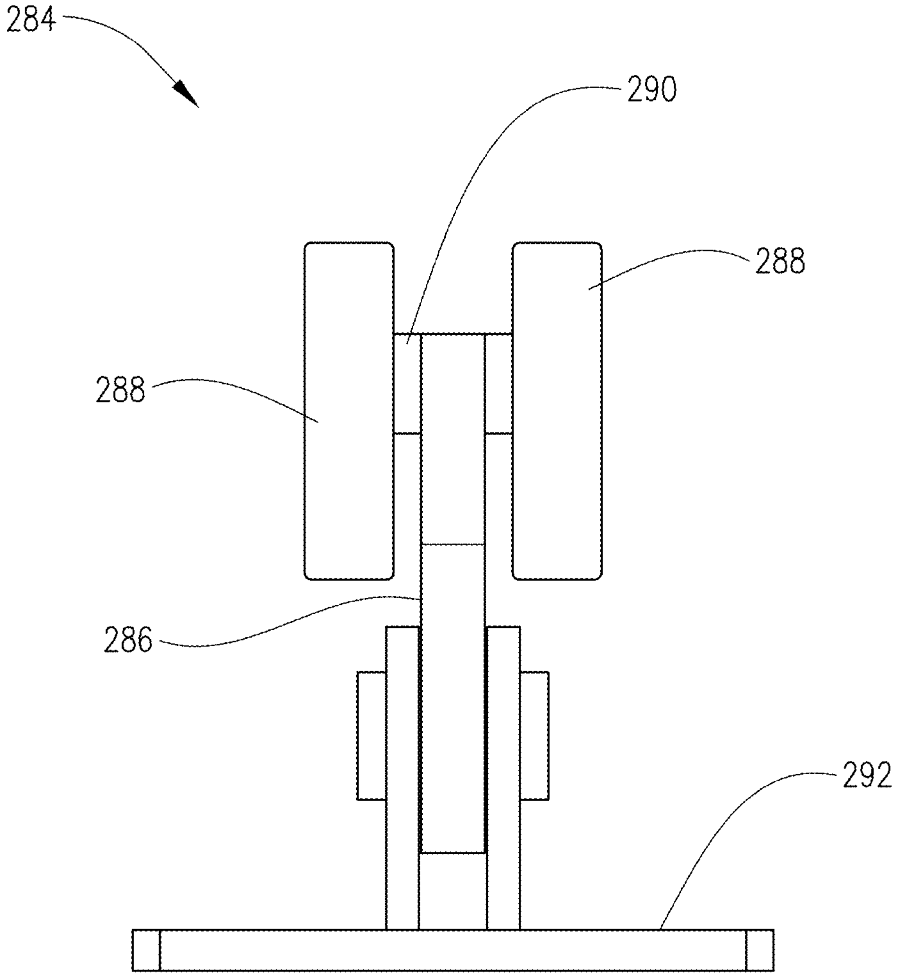
FIG. 24 is an end elevation view of the lower roller assembly shown in FIG. 22, taken along line 24-24.

The lower roller assembly 284, shown in FIGS. 22-24, is formed from a yoke 286 that supports a pair of longitudinally-spaced primary rollers 288. The primary rollers 288 are characterized by parallel and preferably horizontal rotational axes. Supported by the yoke 286 intermediate the primary rollers 288 is a secondary roller 290, preferably having a vertical rotational axis. The yoke 286 is supported by a lower roller platform 292, which is preferably flat and rectangular in shape.

The lower roller assembly 284 is sized, shaped and configured such that the primary rollers 288 are receivable within the lower roller raceway 128 of the lower track 30. When so received, the primary rollers 288 rollingly engage the flat surfaces 90 of the tracks 88 of the lower track sections 34 forming the lower track 30.

The lower roller assembly 284 is likewise sized, shaped and configured such that the secondary roller 290 is receivable within the lower roller raceway 128 of the lower track 30. When so received, the secondary roller 290 rollingly engages the side walls 78 and 80 of the lower track sections 34 forming the lower track 30.

Preferably, the gate assembly 10 comprises a plurality of lower roller assemblies 284, which are preferably identical. More preferably, the gate assembly 10 comprises lower roller assemblies 284 in a number equal to the number of gate posts 24 forming the gate assembly 10. A lower roller assembly 284 is positioned at or near ground level and adjacent each of the gate posts 24, such that the primary and secondary rollers 288 and 290 of each assembly are received within the lower roller raceway 128 of the lower track 30. In the embodiment shown in FIG. 2, in which the gate posts 24 are two in number, the gate assembly 10 comprises two lower roller assemblies 284.

In one embodiment, not shown in the Figures, the lower roller platform is installed directly against the ground, substrate or other structure supporting the gate assembly. In another embodiment, shown in FIG. 25, the lower roller platform 292 of each lower roller assembly 284 rests on a ground bracket assembly 294.

Figure 26:
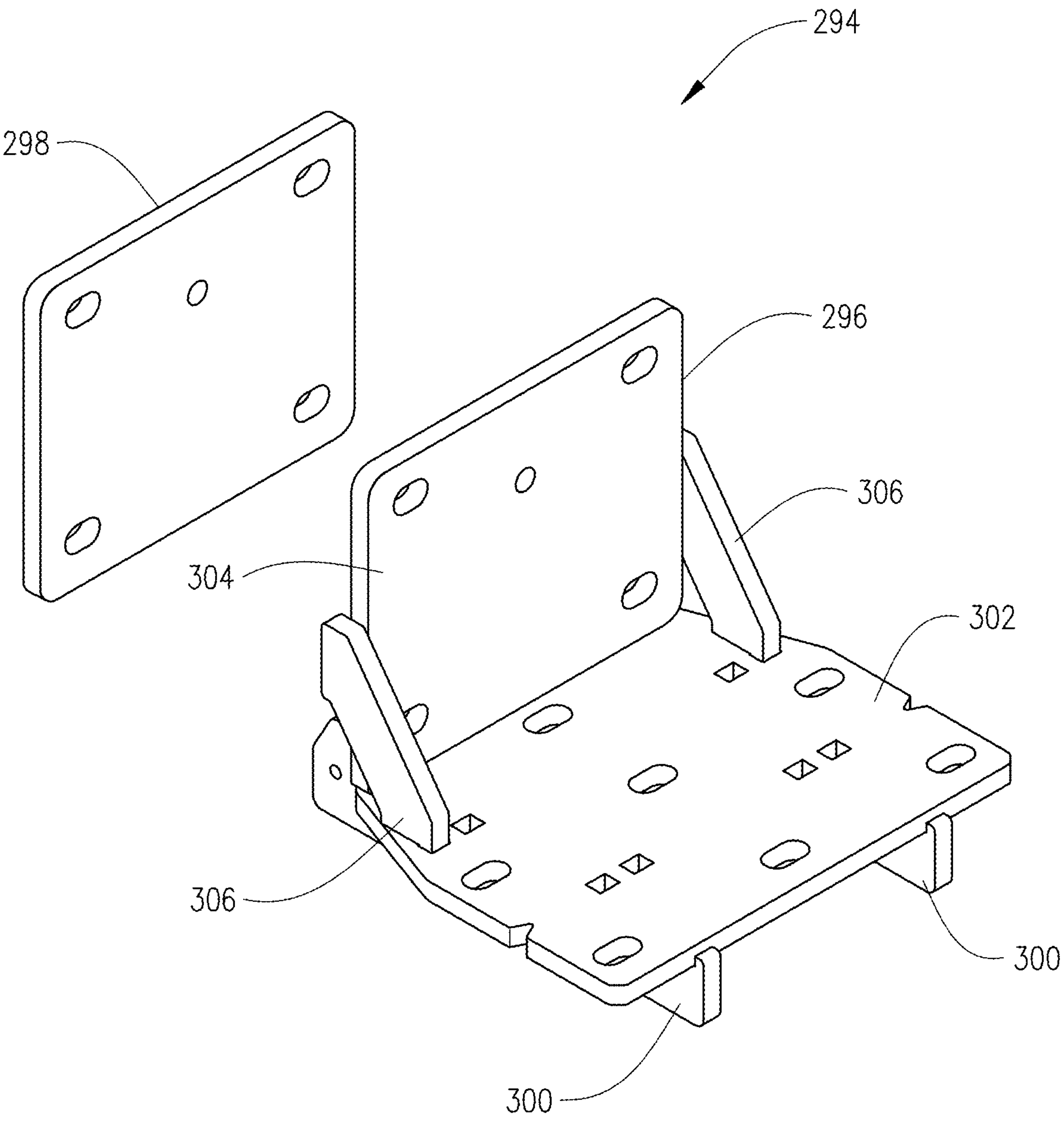
FIG. 26 is a perspective view of a ground bracket.

The ground bracket assembly 294, shown in FIG. 26, comprises a ground bracket 296 and a separate backing plate 298. The ground bracket 296 is formed from a pair of flat arms 300 disposed in side-by-side and parallel relationship. Each arm 300 has a flat base adapted to engage the ground 86. The arms 300 cradle a flat bracket platform 302, within which plural fastener openings are formed. Preferably, the bracket platform 302 extends horizontally. A flat bracket plate 304 joins the bracket platform 302 at one of its edges, on the side of the bracket platform 302 opposite the arms 296. Preferably, the shape of the bracket plate 304 is rectangular, and more preferably square. The bracket plate 304 extends in orthogonal relationship to the bracket platform 302. Opposite edges of the upper side of the bracket plate 304 are interconnected with the bracket platform 302 by a pair of brace elements 306. A plurality of fastener openings are formed in the bracket plate 304. Another pair of aligned fastener openings are formed in the arms 300, on the side of the bracket plate 304 opposite the bracket platform 302.

The backing plate 298 is preferably of the same size, shape and construction as the bracket plate 304. Fastener openings formed in the backing plate 298 register with the fastener openings formed in the bracket plate 304.

The ground bracket assembly 294 is installed by positioning the ground bracket 296 and the backing plate 298 on opposite sides of a gate post 24, such that the fastener openings in the bracket plate 304 and backing plate 298 are aligned. Fasteners, such as bolts, are extended through the aligned openings and actuated. Additional fasteners, such as trilobular screws, are used to interconnect the arms 300 to those sides of the gate post 24 that do not engage the backing plate 298 and bracket plate 304.

The lower roller assembly 284 is installed on the ground bracket 296 by placing the lower roller platform 292 in flush engagement with the bracket platform 302. Fasteners are inserted into aligned fastener openings in the lower roller platform 292 and bracket platform 302, and the fasteners actuated to secure the lower roller assembly 284 to the ground bracket 296. The foregoing steps are repeated for each lower roller assembly 284 and ground bracket assembly 294 comprising the gate assembly 10.

Figure 27:
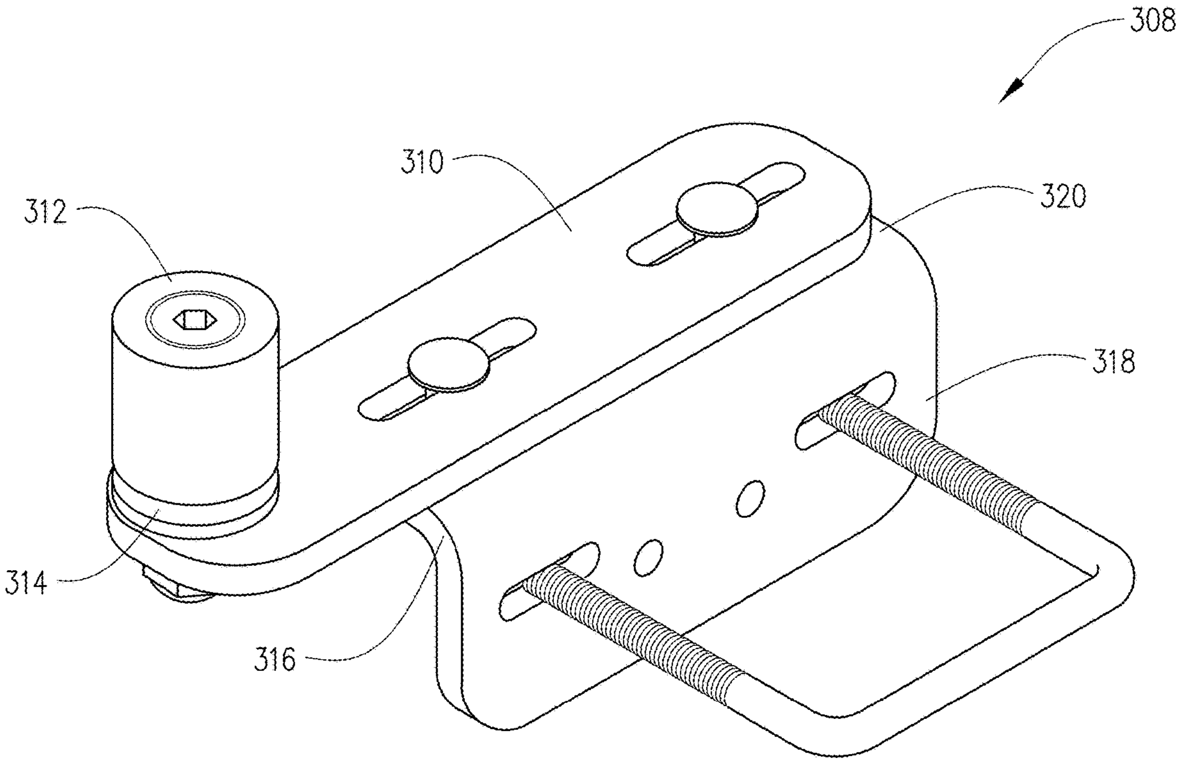
FIG. 27 is a perspective view of an upper roller assembly and an upper bracket.
Figure 28:
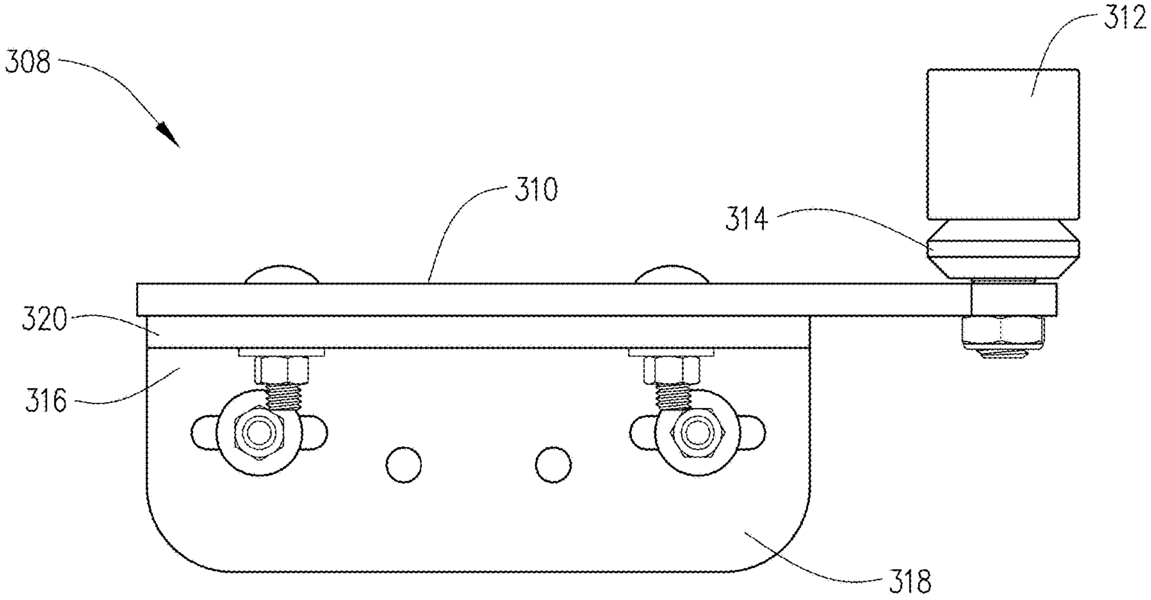
FIG. 28 is a front elevation view of the upper roller assembly and upper bracket shown in FIG. 27.
Figure 29:
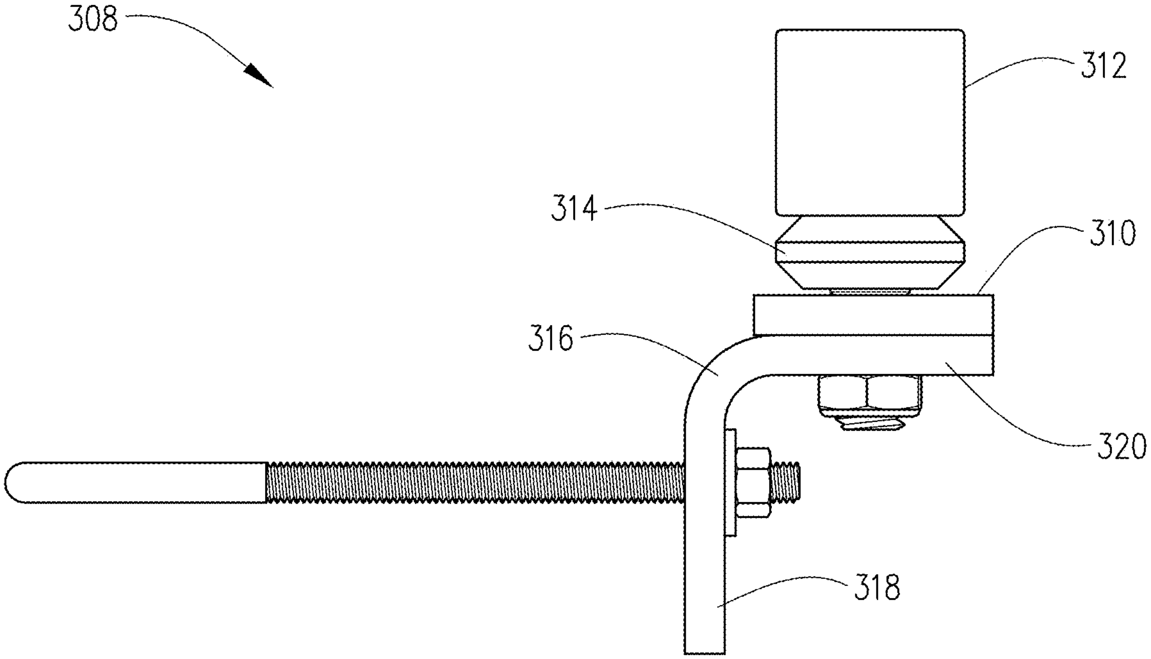
FIG. 29 is an end elevation view of the upper roller assembly and upper bracket shown in FIG. 28, taken along line 29-29.

FIGS. 27-29 show an upper roller assembly 308. The upper roller assembly 308 is formed from an upper roller platform 310, which is preferably flat, rectangular in shape and penetrated by a plurality of fastener openings. Disposed at one end of the upper roller platform 310 is a first roller 312, which is preferably rotatable about a vertical axis that is orthogonal to the upper roller platform 310. Interposed between the first roller 312 and the upper roller platform 310 is a spacer 314, which preferably comprises a second roller.

Preferably, the axis about which the first roller 312 rotates extends through the spacer 314. If the spacer 314 is rotatable, the spacer 314 and the first roller 312 are preferably coaxial, and rotate about the same axis. Preferably, the spacer 314, if rotatable, is not rotatable as a unit with the first roller 312. Instead, the first roller 312 and the spacer 314 should be independently rotatable. The upper roller assembly 308 is sized, shaped and configured such that the first roller 312 is receivable within the upper roller raceway 238 of the upper track 32. When so received, the first roller 312 rollingly engages the side walls 174 of the track sections 132 forming the upper track 32. Preferably, the upper roller assembly 308 is also sized, shaped and configured such that, when the first roller 312 is received within the upper track 32, the spacer 314 remains outside that upper track 32.

Preferably, the gate assembly 10 comprises a plurality of upper roller assemblies 308, which are preferably identical. In one embodiment, the gate assembly 10 comprises upper roller assemblies 308 in a number equal to the number of gate posts 24 forming the gate assembly 10. An upper roller assembly 308 is installed at an elevated position at or adjacent each of the gate posts 24, such that the first roller 312 of each assembly is received within the upper roller raceway 238 in the upper track 32. When the first roller 312 is so received, the spacer 314 remains outside the upper track 32.

Each upper roller assembly 308 is supported at an elevated position adjacent a gate post 24 by an upper bracket 316. As shown in FIGS. 27-29, each upper bracket 316 has the general shape of an angle iron and comprises orthogonal first and second legs 318 and 320. The legs 318 and 320 are preferably flat, rectangular, of equal length, and more preferably of equal width. Each of the legs 318 and 320 is penetrated by fastener openings. Preferably, the upper bracket 316 is of single-piece construction.

An upper bracket 316 is installed by positioning one of its legs, such as the first leg 318, in flush engagement with a side of the gate post 24 at an elevated position. Preferably, the leg is installed on a side of the gate post 24 that extends in orthogonal relationship to the upper track 32. One or more fasteners, such as a U-bolt, are inserted into aligned fastener openings in the bracket 294 and gate post 24, and the fastener or fasteners actuated to secure the upper bracket 316 to the gate post 24.

Figure 30:
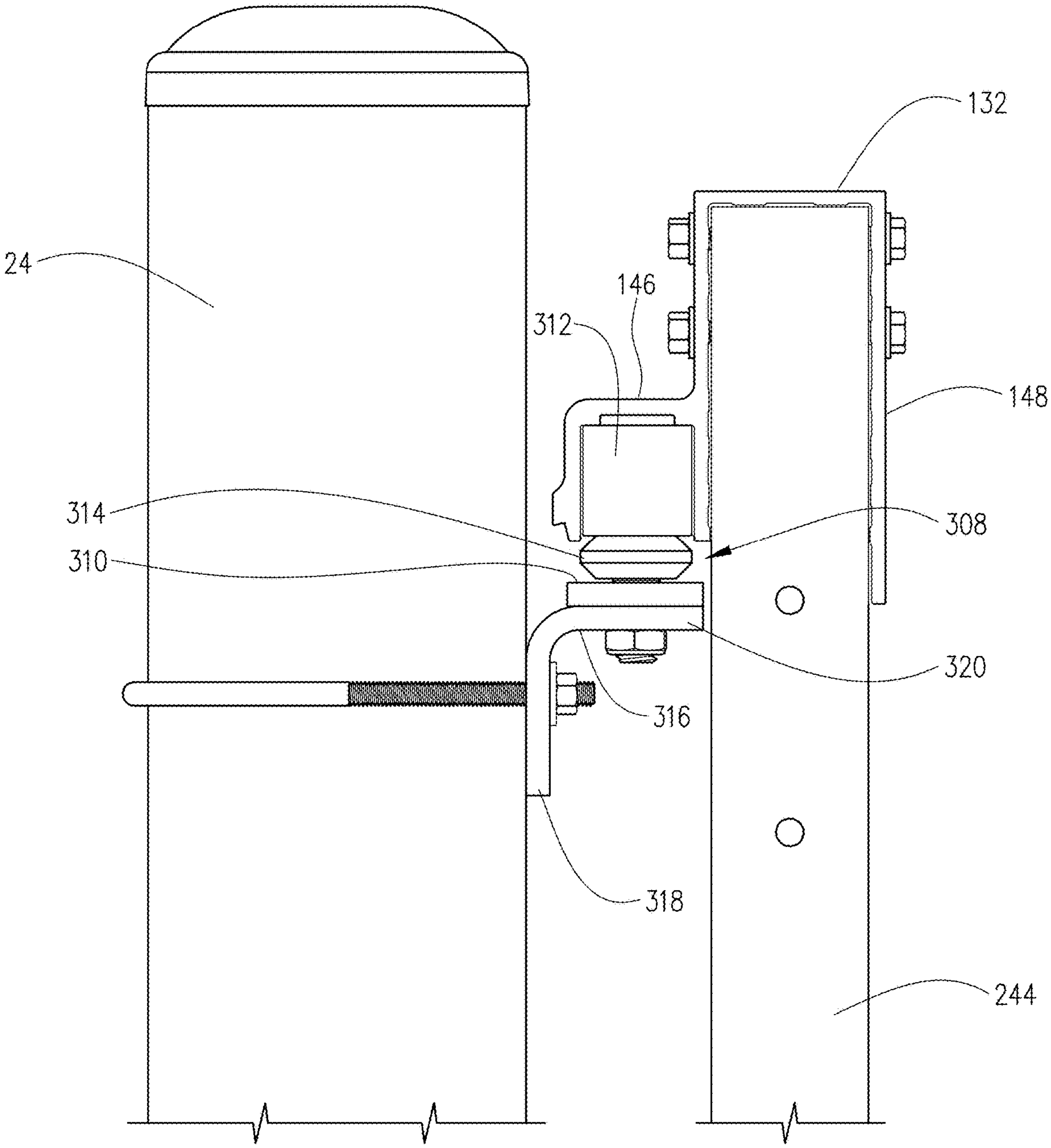
FIG. 30 is an end elevation view, similar to FIG. 29, showing an upper roller assembly positioned within an upper track. The upper roller assembly is supported by an upper bracket which is in turn supported by a gate post. The upper splicing element is omitted.
Figure 22:
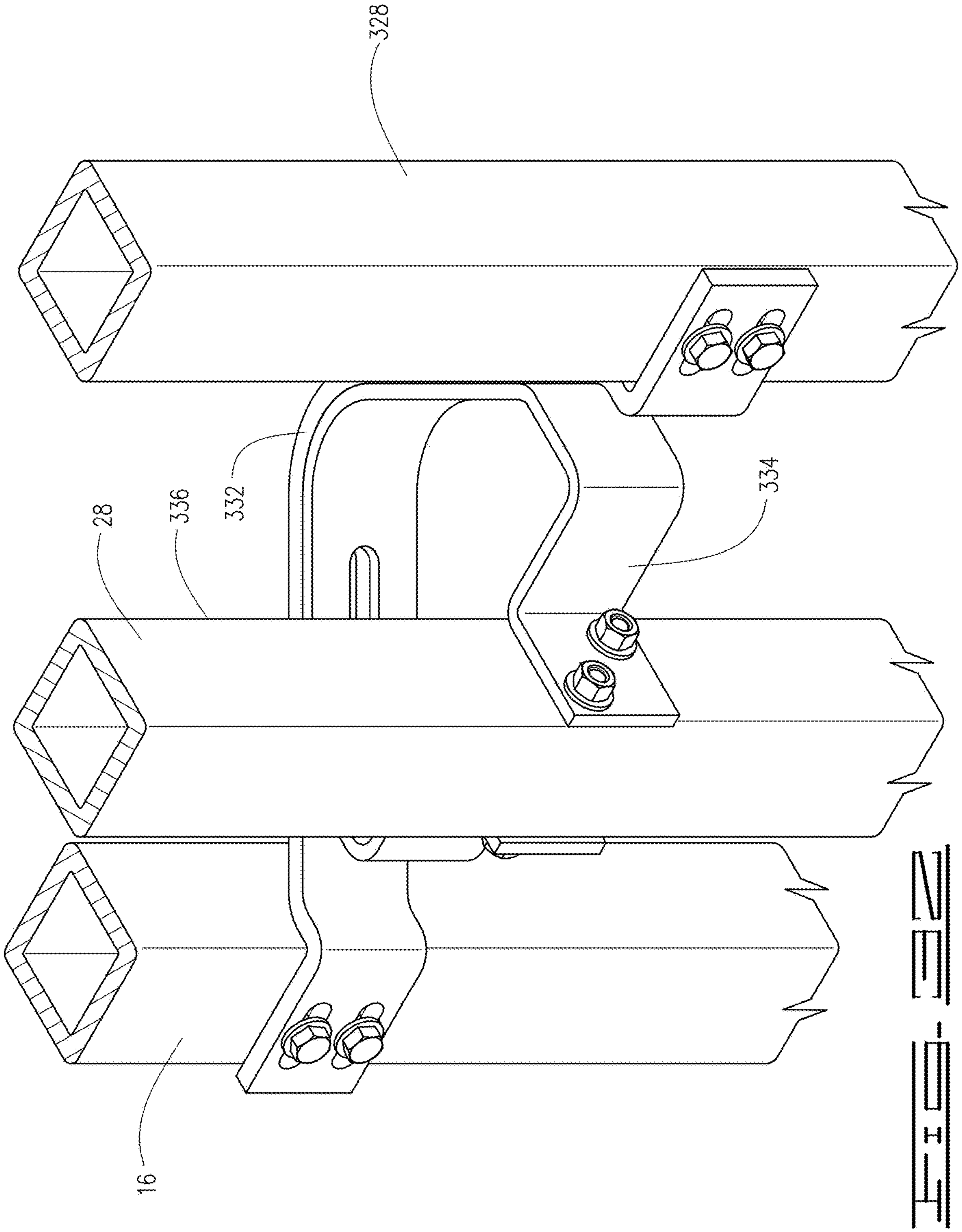

The upper roller assembly 308 is installed on the upper bracket 316 by placing the upper roller platform 310 in flush engagement with the second leg 320 of the upper bracket 316, as shown in FIG. 30. The end of the upper roller platform 310 that carries the first roller 312 should be placed closest to the upper track 32. Fasteners are inserted into aligned fastener openings in the upper roller platform 310 and second leg 320, and the fasteners actuated to secure the upper roller assembly 308 to the upper bracket 316.

The foregoing steps are repeated for each upper roller assembly 308 and upper bracket 316 comprising the gate assembly 10.

Figure 31:
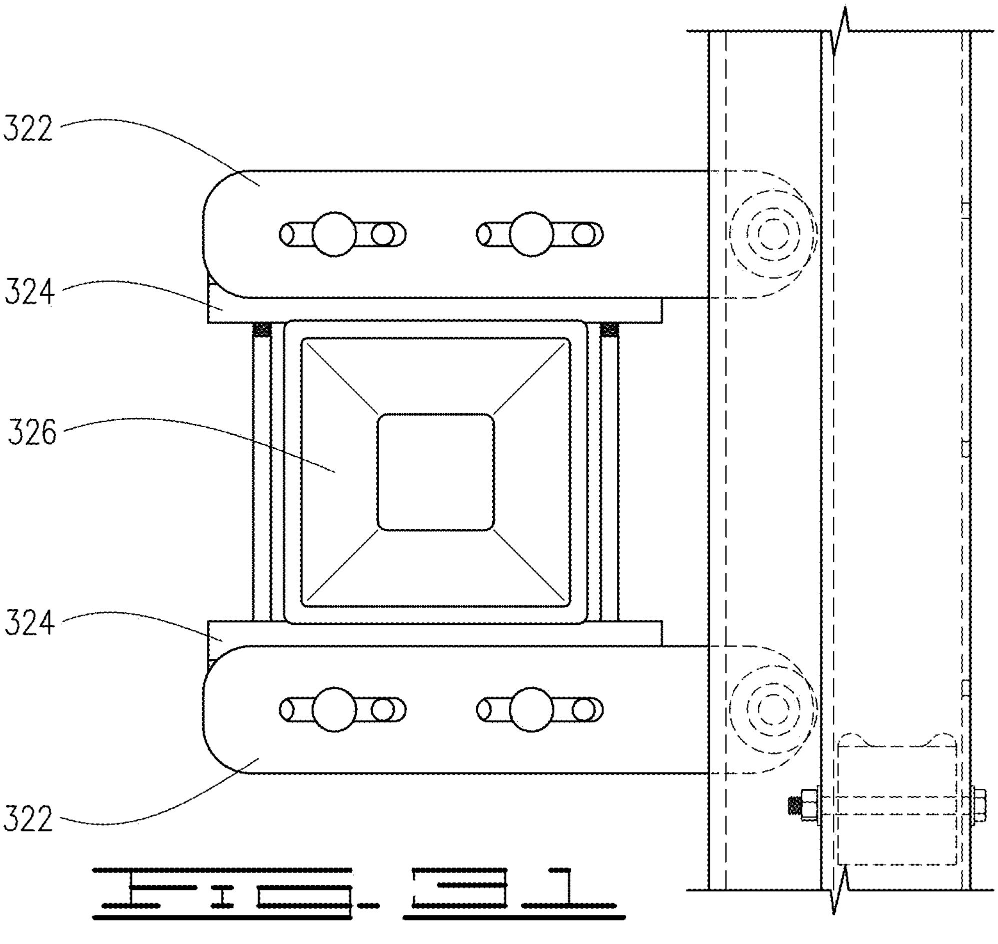
FIG. 31 is a top plan view of another embodiment of a gate assembly. A gate post carries two upper roller assemblies and two upper brackets.

In another embodiment of a gate assembly, not shown in FIGS. 1-3, two upper roller assemblies 322 and two upper brackets 324 are provided for each gate post comprising the gate assembly. As shown in FIG. 31, an upper roller assembly 322 and upper bracket 324 are installed on each of two opposite sides of each gate post 326. Other aspects of this embodiment are identical to those described with reference to FIGS. 1-3.

With reference to FIG. 1-3, the gate assembly 10 further comprises a vertically-extending latch post 328, which is positioned adjacent the first fence post 16. The latch post 328, like the first fence post 16, is situated near the edge of the gap 22, opposite the gate posts 24. The latch post 328 is securely anchored at its base into a substrate 330, such as the ground or an underground mass of concrete.

As shown in FIG. 32, a V-shaped receiver 332 is supported at its opposite ends by the latch post 328 and first fence post 16. A guide 334 having a shape at least partially complementary to the receiver 332 is mounted on the leading edge 336 of the gate frame 28. The receiver 332 and guide 334 should have identical heights. After the leading edge 336 of the gate frame 28 crosses the gap 22, the guide 334 enters the receiver 332, thereby latching the gate assembly 10. The gate frame 28 is a cantilevered structure that moves along a rectilinear path between open and closed positions. In the open position, the gate frame 28 fully clears the gap 22, while in the closed position, the gate frame 28 fully blocks the gap 22. The lower and upper roller assemblies 284 and 308 maintain the gate frame 28 at the proper height, and facilitate its rectilinear movement. The gate assembly 10 may include an operator (not shown) for powering rectilinear movement of the gate frame 28.

Kits of components can be useful for building a gate assembly 10. A first kit may comprise at least one lower track section 34 and at least one upper track section 132. A second kit may comprise at least two lower track sections 34 and at least one lower splicing assembly 36. A third kit may comprise at least two upper track sections 132 and at least one upper splicing element 134. A fourth kit may comprise at least one lower track section 34, at least one upper track section 132, a plurality of upright members 244 and a plurality of pickets 278. A fifth kit may comprise at least one upper track section 132 and at least one upper roller assembly 308. The fifth kit may further comprise at least one upper bracket 316. Additional components of the gate assembly 10 may be added to any of these kits.

Unless otherwise stated herein, any of the various parts, elements, steps and procedures that have been described should be regarded as optional, rather than as essential. Changes may be made in the construction, operation and arrangement of the various parts, elements, steps and procedures described herein without departing from the spirit and scope of the invention as described in the following claims.

The invention claimed is:

1. A kit, comprising:

first and second lower track sections, each lower track section comprising:

an elongate lower side wall having a body that joins a terminal heel; and an elongate splicing element configured to join the first and second lower track sections, the splicing element having a uniform cross-sectional shape along its length and comprising:

an elongate trough; and an elongate base having a longitudinal ridge formed therein, the ridge laterally offset from the trough;

in which the heel of the side wall of each lower track section is receivable within the trough, and in which the body of the side wall of each lower track section is positionable in face-to-face relationship with the base and in engagement with the ridge.

2. The kit of claim 1 in which the base is at least slightly concave.

3. A gate, comprising:

a movable frame that includes the kit of claim 1, in which the first and second lower track sections are joined by the splicing element.

4. The gate of claim 3 in which the lower side walls of the joined first and second lower track sections define a boundary of a raceway, and further comprising:

at least one rotatable roller receivable within the raceway.

5. The kit of claim 1 in which the splicing element is configured to join the first and second lower track sections in end-to-end engagement.

6. The kit of claim 1 in which the ridge is elongate and extends longitudinally in parallel relationship to the trough.

7. The kit of claim 1 in which each lower track member is of single-piece construction and comprises a channel-shaped structure.

8. The kit of claim 1 in which a plurality of fastener openings are formed in the splicing element.

9. The kit of claim 2 in which the area of the base adjoining the ridge is concave.

10. The kit of claim 1 in which the side wall of each lower track section further comprises:

a flat web situated opposite the heel, from which the side wall depends;

an elongate and shelf-like track that joins the heel and projects from the side wall at a location intermediate the heel and the web; and an elongate edge where the heel joins the track.

11. The kit of claim 1 in which the side wall of each lower track section further comprises:

an elongate and shelf-like track that joins the heel and projects from the side wall;

in which the trough of the splicing element is sized not to receive the track concurrently with the heel to which it is joined.

12. The kit of claim 1 in which the splicing element is configured such that, when engaged with a lower track section, its base may rock slightly about its ridge, the ridge acting as a fulcrum.

13. A kit, comprising:

first and second lower track sections, each lower track section comprising:

an elongate first lower side wall having a body that joins a terminal heel; and an elongate second lower side wall extending in spaced and parallel relationship to the first lower side wall, the second lower side wall having a body that joins a terminal heel; and an elongate first splicing element configured to join the first and second lower track sections, the first splicing element having a uniform cross-sectional shape along its length and comprising:

an elongate trough; and an elongate base having a longitudinal ridge formed therein, the ridge laterally offset from the trough; and a second splicing element configured as a mirror image of the first splicing element;

in which the heel of the first lower side wall of each lower track section is receivable within the trough of the first splicing element, and in which the body of the first lower side wall of each lower track section is positionable in face-to-face relationship with the base and in engagement with the ridge of the first splicing element; and in which the heel of the second lower side wall of each lower track section is receivable within the trough of the second splicing element, and in which the body of the second lower side wall of each lower track section is engagable with the ridge of the second splicing element.

* * * * *